US012631293B2

(12) United States Patent
Rinaldi et al.

(10) Patent No.: US 12,631,293 B2
(45) Date of Patent: May 19, 2026

(54) COMPACT VOLUMETRIC PUMP

(71) Applicant: DANA ITALIA S.R.L., Arco (IT)

(72) Inventors: Pier Paolo Rinaldi, Arco (IT);
Giacomo Faggiani, Rovereto (IT);
Mark Slater, Warwickshire (GB)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/888,381

(22) Filed: Sep. 18, 2024

(65) Prior Publication Data

US 2026/0078870 A1      Mar. 19, 2026

(51) Int. Cl.
| | |
|---|---|
| *F16N 13/10* | (2006.01) |
| *F04B 9/04* | (2006.01) |
| *F04B 53/10* | (2006.01) |

(52) U.S. Cl.
CPC .............. *F16N 13/10* (2013.01); *F04B 9/042* (2013.01); *F04B 9/045* (2013.01); *F04B 53/1002* (2013.01)

(58) Field of Classification Search
CPC .......... F16N 13/10; F04B 9/042; F04B 9/045; F04B 53/1002
See application file for complete search history.

(56) References Cited

U.S. PATENT DOCUMENTS

| | | | | |
|---|---|---|---|---|
| 2,993,446 | A * | 7/1961 | Pleuger | F04B 43/067 |
| | | | | 417/386 |
| 3,139,156 | A * | 6/1964 | Urso | F16N 13/10 |
| | | | | 417/521 |
| 3,187,673 | A * | 6/1965 | Kramer | F16N 13/04 |
| | | | | 92/13.41 |
| 3,276,822 | A * | 10/1966 | Lister | B60T 8/3295 |
| | | | | 303/61 |
| 3,524,684 | A * | 8/1970 | Skoyles | B60T 8/4283 |
| | | | | 303/61 |
| 3,902,826 | A * | 9/1975 | Nagel | F04B 23/06 |
| | | | | 417/388 |
| 4,006,797 | A * | 2/1977 | Keske | F16N 13/14 |
| | | | | 417/471 |
| 4,068,982 | A * | 1/1978 | Quarve | F04B 43/067 |
| | | | | 417/387 |
| 4,099,597 | A * | 7/1978 | Powell | F04B 9/042 |
| | | | | 417/471 |

(Continued)

OTHER PUBLICATIONS

Marini, M et al., "Valveless, Mechanical, Pressure Regulating Pump," U.S. Appl. No. 18/439,527, filed Feb. 12, 2024, 41 pages.

*Primary Examiner* — Henry Y Liu
(74) *Attorney, Agent, or Firm* — McCoy Russell LLP

(57) ABSTRACT

Methods and systems for a mechanically driven pump are provided. The pump is for lubrication and comprises: a cam lobe or an eccentric mounted on and driven by a shaft; a piston being in contact with the cam lobe or the eccentric; a spring acting on the piston; an inlet check valve positioned in an inlet port; and an outlet check valve positioned in an outlet port, where the inlet check valve and the outlet check valve do not comprise preload springs and are installed vertically in a normally closed position due to a force of gravity acting on internal balls of the check valves. Orifices fluidly coupled to the inlet check valve and the outlet check valve are position outside the piston stroke to prevent the piston from acting as a guillotine valve, which may increase volumetric efficiency of the mechanically driven pump.

20 Claims, 14 Drawing Sheets

(56) References Cited

U.S. PATENT DOCUMENTS

| | | | | | |
|---|---|---|---|---|---|
| 4,154,326 | A | * | 5/1979 | Wolf | B60T 15/045 |
| | | | | | 192/220 |
| 4,173,437 | A | * | 11/1979 | Leka | F04B 53/008 |
| | | | | | 417/521 |
| 4,354,715 | A | * | 10/1982 | Farr | B60T 8/368 |
| | | | | | 303/10 |
| 4,357,617 | A | * | 11/1982 | Shimazawa | B41J 2/175 |
| | | | | | 347/89 |
| 4,387,934 | A | * | 6/1983 | Farr | B60T 8/4283 |
| | | | | | 303/116.4 |
| 4,619,589 | A | * | 10/1986 | Muller | F04B 43/067 |
| | | | | | 417/388 |
| 4,715,666 | A | * | 12/1987 | Farr | B60T 8/5037 |
| | | | | | 303/116.4 |
| 4,755,007 | A | * | 7/1988 | Mollat | B60T 11/18 |
| | | | | | 137/625.68 |
| 4,915,193 | A | * | 4/1990 | Marquart | F16H 57/0447 |
| | | | | | 184/6.12 |
| 4,941,713 | A | * | 7/1990 | Farr | B60T 8/344 |
| | | | | | 303/158 |
| 4,962,972 | A | * | 10/1990 | Pizzo | B60T 8/3295 |
| | | | | | 303/61 |
| 5,156,531 | A | * | 10/1992 | Schmid | F04B 49/225 |
| | | | | | 417/295 |
| 5,246,351 | A | * | 9/1993 | Horn | F04B 43/067 |
| | | | | | 417/387 |
| 5,601,345 | A | * | 2/1997 | Tackett | B60T 8/4031 |
| | | | | | 303/116.3 |
| 5,626,466 | A | * | 5/1997 | Ruoff | F04B 1/0426 |
| | | | | | 417/470 |
| 5,662,023 | A | * | 9/1997 | Carson | F01B 29/00 |
| | | | | | 417/454 |
| 5,722,738 | A | * | 3/1998 | Beck | F04B 53/125 |
| | | | | | 303/116.4 |
| 5,810,567 | A | * | 9/1998 | Horn | F04B 43/0054 |
| | | | | | 417/387 |
| 6,000,764 | A | * | 12/1999 | Dokas | F04B 53/126 |
| | | | | | 137/15.08 |
| 6,016,790 | A | * | 1/2000 | Makino | F02M 59/06 |
| | | | | | 123/496 |
| 6,070,951 | A | * | 6/2000 | Nakazawa | B60T 8/4031 |
| | | | | | 303/116.4 |
| 6,093,003 | A | * | 7/2000 | Hauser | F04B 53/14 |
| | | | | | 417/523 |
| 6,113,365 | A | * | 9/2000 | Siegel | B60T 8/4031 |
| | | | | | 417/434 |
| 6,302,663 | B1 | * | 10/2001 | Schuller | F04B 1/0408 |
| | | | | | 417/470 |
| 6,582,203 | B2 | * | 6/2003 | Herrmann | F04B 9/045 |
| | | | | | 417/284 |
| 6,758,184 | B1 | * | 7/2004 | Lee | F01M 1/02 |
| | | | | | 123/198 C |
| 6,846,166 | B2 | * | 1/2005 | Kinugawa | F04B 43/067 |
| | | | | | 417/385 |
| 7,008,198 | B2 | * | 3/2006 | Lee | F04B 53/18 |
| | | | | | 417/364 |
| 7,114,929 | B2 | * | 10/2006 | Kinugawa | F04B 53/067 |
| | | | | | 417/571 |
| 7,566,205 | B2 | * | 7/2009 | Kinugawa | F04B 43/067 |
| | | | | | 417/244 |
| 8,365,654 | B2 | * | 2/2013 | Waller | F04B 53/162 |
| | | | | | 417/559 |
| 8,944,780 | B2 | * | 2/2015 | Reilly | A61M 5/16877 |
| | | | | | 137/625.48 |
| 9,261,083 | B2 | * | 2/2016 | Sechler | F04B 53/20 |
| 9,297,331 | B2 | * | 3/2016 | Glugla | F02M 59/102 |
| 9,446,748 | B2 | * | 9/2016 | Ward | B60T 8/329 |
| 10,550,997 | B2 | * | 2/2020 | Powell | F04B 53/166 |
| 10,883,492 | B2 | * | 1/2021 | Misuno | B60T 8/4031 |
| 10,975,816 | B2 | * | 4/2021 | Pellini | F02M 59/027 |
| 11,104,313 | B2 | * | 8/2021 | Norberg | B60T 8/4031 |
| 2002/0001525 | A1 | * | 1/2002 | Herrmann | F04B 1/0408 |
| | | | | | 417/470 |
| 2003/0077190 | A1 | * | 4/2003 | Kinugawa | F04B 43/067 |
| | | | | | 417/390 |
| 2004/0247471 | A1 | * | 12/2004 | Lee | F04B 17/05 |
| | | | | | 417/470 |
| 2005/0100453 | A1 | * | 5/2005 | Kinugawa | F04B 43/067 |
| | | | | | 417/390 |
| 2006/0083636 | A1 | * | 4/2006 | King | F16N 13/10 |
| | | | | | 417/415 |
| 2006/0280621 | A1 | * | 12/2006 | Kinugawa | F04B 43/067 |
| | | | | | 417/279 |
| 2007/0261931 | A1 | * | 11/2007 | Beck | B60G 17/044 |
| | | | | | 188/315 |
| 2008/0121216 | A1 | * | 5/2008 | Shafer | F04B 1/0413 |
| | | | | | 123/456 |
| 2012/0244018 | A1 | * | 9/2012 | Reilly | B01F 35/882 |
| | | | | | 417/266 |
| 2014/0331975 | A1 | * | 11/2014 | Glugla | F02M 59/102 |
| | | | | | 123/504 |
| 2015/0129064 | A1 | * | 5/2015 | Reilly | B01F 35/833 |
| | | | | | 137/605 |
| 2018/0087492 | A1 | * | 3/2018 | Powell | F04B 1/07 |
| 2019/0162141 | A1 | * | 5/2019 | Pellini | F02M 59/027 |
| 2019/0242376 | A1 | * | 8/2019 | Misuno | B60T 8/4031 |
| 2024/0247647 | A1 | | 7/2024 | Marini et al. | |

* cited by examiner

COMPACT VOLUMETRIC PUMP

TECHNICAL FIELD

The present disclosure relates to a volumetric pump that provides focused lubrication to mechanical components.

BACKGROUND AND SUMMARY

Mechanical systems may include sliding components and rotating components (e.g., gears, shafts, bearings, etc.) that are lubricated to reduce friction and wear. In some applications, these components may be passively lubricated by some components splashing lubricant on other components that are enclosed in a closed volume (e.g., a gearbox). For example, gears rigidly coupled to one shaft of a transmission that are at least partially submerged in lubricant may fling the lubricant within a gearbox to lubricate gears on another shaft of the transmission that are not submerged in lubricant. Lubricating components in this way may affect efficiency. In particular, a large amount of lubricant may be splashed to locations in the gearbox where lubrication is not needed, decreasing transmission efficiency.

Providing more focused lubrication targeting can reduce power losses. The focused lubrication may be supplied by a pump, where an output from the pump may be directed to lubricate areas via passages or conduits so that excess lubrication may be reduced.

An electrically driven pump may be applied to such systems and may be positioned inside the lubricated area. However, electrically driven pumps increase electrical connections and/or wiring and also affect serviceability. On the other hand, pumps that are located outside of the lubricated area may supply lubricant to the lubricated areas via conduits or passages, but these external conduits or passages may be subject to leaks. Another approach may include pumps driven via a mechanical system, such as via one or more rotational elements of the mechanical system.

Such mechanically driven pumps may include scavenging pumps, comprising at least a piston, a spring, a pump body, and an eccentric or cam. The eccentric comprises an eccentric lobe contacting the piston, or the cam comprises a cam lobe contacting the piston. The skirt of the piston may act as a guillotine valve to the one or more inlet ports and outlet ports to the pump body, producing a higher differential pressure across the choke during a compression stroke compared to another differential pressure during an expansion stroke, delivering a non-null flow. However, such pumps may have reduced volumetric efficiency, where the first part of the stroke is used to close the port and fluid of the pressure chamber is prevented from being delivered to the outlet. Additionally, as the lubricant is forced to flow through an orifice to a pressure of the pump body or to the outlet, the buildup of pressure to the pressure chamber for the piston may become higher than a desired pressure threshold. Above the pressure threshold, the pressure chamber, the piston, and/or the ports may experience acute or chronic degradation.

The inventors have recognized the aforementioned challenges and developed a pump for lubrication. The pump for lubrication comprising: a lobe mounted on and driven by a shaft; a piston being in contact with the lobe; a spring acting on the piston; an inlet check valve positioned in an inlet port; and an outlet check valve positioned in an outlet port, where the inlet check valve and the outlet check valve do not comprise preload springs and are installed vertically in a normally closed position due to a force of gravity acting on internal balls of the inlet check valve and outlet check valve.

By providing a mechanically driven pump of reduced complexity within the confines of an area that contains lubricated components, it may be possible to provide highly reliable and focused lubrication to components. Further it may reduce the likelihood of leakage from a housing for the mechanical system and/or from the pump body.

In examples, the pump may operate irrespective of a direction of rotation of a driving source so that lubrication may be reliable. Further, the pump may be self-priming independent of fractions of air and lubricant so that lubricant flow may be maintained if the pump is deployed in a dry sump environment.

For example, a high ratio of displacement over the clearance volume of the pump may be provided, which allows for the pump to be self-priming. Further still, the volumetric efficiency may be improved compared to pumps lacking check valves as positioned. In an example, inlet and outlet check valves may be incorporated into the pump body, increasing compactness of the pump.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3A shows a schematic of a mechanically driven pump system in a first position.

FIG. 3C shows the schematic of the mechanically driven pump system in a third position.

FIG. 3D shows the schematic of the mechanically driven pump system in a fourth position.

DETAILED DESCRIPTION

Figure 1:
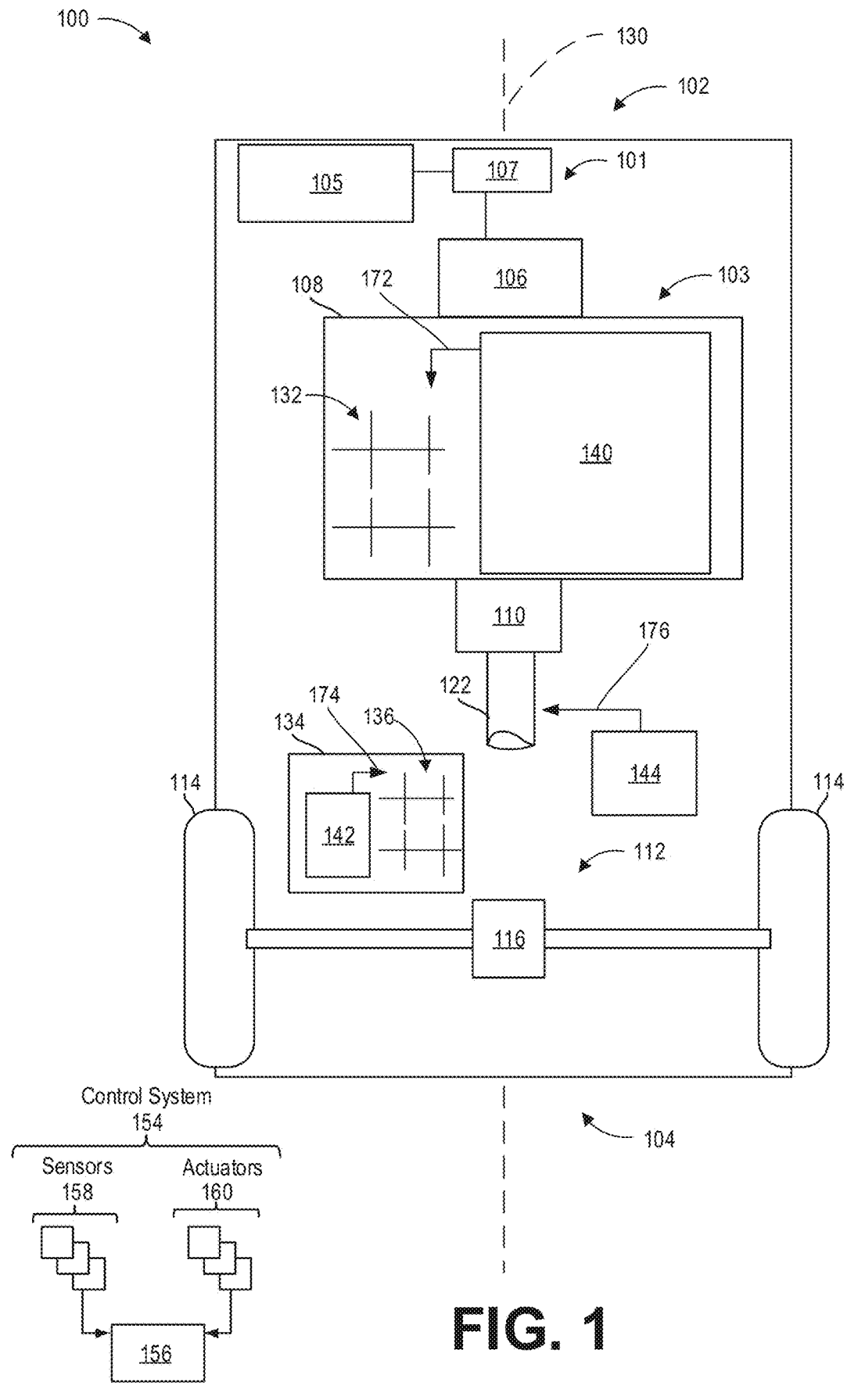
FIG. 1 is a schematic of a vehicle including a vehicle that comprises one or more lubrication systems of the present disclosure.

The description relates to a mechanically driven pump comprising at least two check valves, where the at least two check valves include an inlet check via which fluid may enter a pressure chamber of the pump and an outlet check valve via which fluid may exit the pump pressure chamber. The mechanically driven pump may be driven via a mechanical system, such as a mechanical system lubricated by the mechanically driven pump. The pump may therein be housed in an enclosed space or a housing, such as a transmission, and driven without an electrical motor.

A plurality of holes may house the inlet and outlet check valves, where the holes include at least a first hole may house the inlet check valve and at least a second hole may house the outlet check valve. The plurality of holes may be bored or drilled from the pump body, allowing for modifications such as changes to pressure and volumetric flow through the valves and valve size to be made via boring, drilling, or other methods of machining the pump body. The pump of the present disclosure may therein reduce cost of altering features of the pump, as features altered, such as fluid passages for example, may be machined to be enlarged. Further the simplicity of the pump of the present disclosure, specifically the check valves, may reduce cost of materials and components used to manufacture the pump.

A possible embodiment of a compact mechanically driven pump that may act as a volumetric scavenging pump to be embedded in a mechanical system is described. In a reduced number of part implementation, the pump is composed of a piston, a spring, a pump body and an eccentric or cam. Additionally, the pump remains effective in both rotational directions. One or more inlet ports are machined in the pump body.

A skirt of the piston may act as a guillotine valve on the one or more inlet ports. The outlet port is in the form of an orifice and the pump relies on a higher differential pressure across the choke during the compression stroke when compared to the differential pressure during the expansions stroke to deliver a non-null flow. An advantage of such an approach is the avoidance of any dedicated valve. The first part of the stroke is used to close the guillotine port not delivering any fluid to the outlet and moreover, in the suction strokes minimum backflow from the outlet to the chamber is possible. The flow forced through an orifice of the pump is such that the pressure built up and change in pressure within a pressure chamber of the compact mechanically driven pump may be high enough to cause degradation to the pump.

In an example, to improve the volumetric efficiency and reduce excessive pressure chamber above a threshold of pressure, the configuration of the mechanically driven pump may reduce excessive chamber pressure build up and keep the pump volumetric efficiency high via the use of gravity actuated check valves. The gravity actuated check valves may prevent flow of fluid into the chamber during the end of an compression stroke and prevent flow of fluid out of the chamber during the beginning of an expansion stroke, while not using the piston as a guillotine valve.

Scavenge pumps possesses characteristics allowing operation (e.g., pumping) with a mixture of air and liquid in an unknown proportion. Consequently, the performance and efficiency of the pump are subject to unpredictable and significant variations. Specifically, as the percentage of air in the mixture increases, the pressure generated by the pump decreases. Due to this reason, the use of spring-loaded check valves is not suitable for this application. In some cases, the pump pressure may be too low to overcome the force exerted by the spring and open the valve.

To address this issue, the mechanically driven pump includes at least two springless check valves. The springless check valves are check valves that lack springs, such as preload springs. The springless check valves are oriented vertically relative to a direction of gravitational force, such that the force of gravity acting on the ball keeps the valve closed. Since the weight of the closing ball is considerably lower than that of a preloaded spring, the check valve can operate even with the minimal pressure experienced at low speeds of translating the piston. Further the lower pressures allowing the opening of the springless check valves allow for higher amounts of air or other gaseous fluids relative to liquid fluid to be pumped via the pump, compared to configurations of other check valves that include springs. The springless check valves may include at least the inlet check valve and the outlet check valve described above.

The pump body of the pump may house the piston and the spring, where the pressure chamber is a volume between the piston and the pump body that may house the spring. The lobe may contact the piston. The rotation of the lobe may drive the piston to translate up and down, pressing upon and removing pressure from the spring in a cyclical manner. The translation of the piston may increase volume and decrease the volume of the pressure chamber, therein decreasing the pressure and increasing the pressure, respectively. The lobe may be driven via the mechanical system, such as via torque from a rotating element. For a first example, the mechanically driven pump may be cam driven spring operated pump, where the lobe is a cam lobe. For a second example, the mechanically driven pump may be an eccentricity driven pump, where the lobe is an eccentric lobe. The mechanically driven pump applies force to the piston, and may therein simultaneously operate as a force transfer mechanism to the piston and a device that opens and closes the springless check valves via pressure.

A vertical arrangement of the inlet and outlet check valve is such as to be normally closed via the force of gravity. The inlet and outlet check valve may be incorporated into the pump body, increasing the compactness relative to arrangements of pumps with valves external to the pump body. The pump may be arranged, such that the inlet check valve may be closed during a compression stroke of the pump, and the outlet valve may be closed during the expansion stroke, via the differential pressures of the pressure chamber acting against the force of gravity. The arrangement may remove the use of the piston as a guillotine valve for opening and closing inlets or outlets to the pressure chamber. The first part of expansion and compression strokes may therein be used via the mechanically driven pump of the present disclosure to close ports while still delivering the fluid to and from the pressure chamber. The inlet and outlet check valves may therein increase volumetric efficiency for the mechanically driven pump of the present disclosure compared to another pump incorporating a configuration of piston that acts as a guillotine valve. It is to be appreciated, that a compression stroke may alternatively be referred to as a delivery stroke, as fluid may be delivered from the pump via the compression stroke. Further, it is to be appreciated that an expansion stroke may alternatively be referred to as an intake stroke, as the pump may intake fluid via the expansion stroke.

The mechanically driven pump of the present disclosure has the advantage of being able to function irrespective of a direction energy is input to the pump. The mechanically driven pump may also operate without a controller and actuators. Further, the mechanically driven pump may be self-priming, such that the mechanically driven pump may operate to move a fluid, such as a lubricant, when air is present at the pump. The self-priming of the mechanically driven pump may allow the mechanically driven pump to be used as a scavenger pump.

Figure 2A:
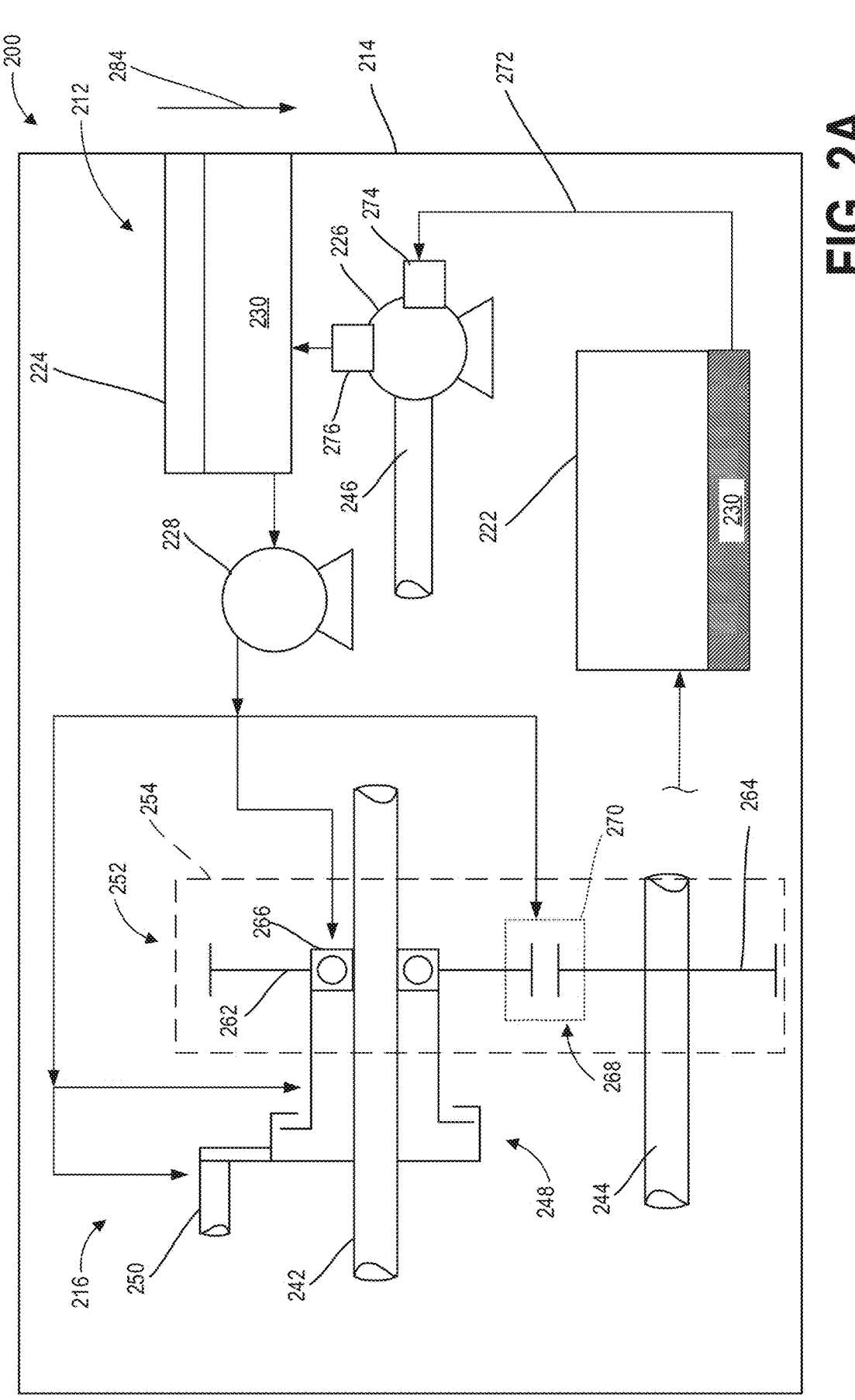
FIG. 2A is a schematic of a first configuration of a lubrication system and a mechanical system lubricated therein.
Figure 2B:
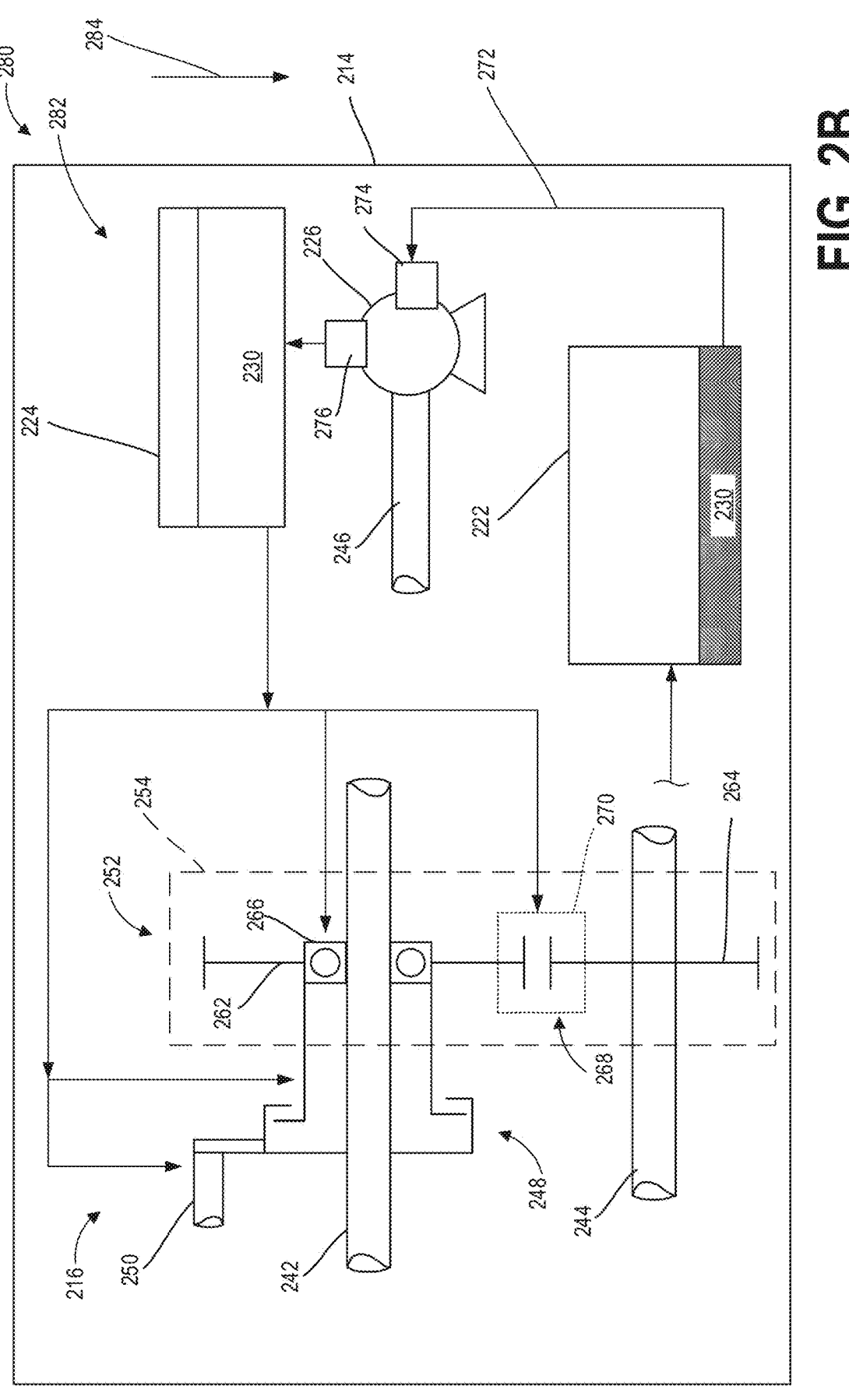
FIG. 2B is a schematic of a second configuration of a lubrication system and the mechanical system lubricated therein.

FIG. 1 is a schematic of a vehicle including a vehicle that comprises one or more lubrication systems of the present disclosure. FIG. 2A is a schematic of a first configuration of a lubrication system and a mechanical system lubricated therein. The first configuration of FIG. 2A includes a pump of the present disclosure used as the scavenger pump of the dry reservoir and a second pump, where the second pump is fluidly coupled to a calm reservoir. The second pump pumps lubricant from the calm reservoir and lubricating lubricant one or more components of the mechanical system in a targeted manner to. FIG. 2B is a schematic of a second configuration of a lubrication system and the mechanical system lubricated therein. The second configuration of FIG. 2B includes the pump of the present disclosure used as the scavenger pump of the dry reservoir. The calm reservoir of the lubrication system of FIG. 2B is configured to passively lubricate one or more components of the mechanical system in a targeted manner and lacks the second pump of FIG. 2A.

Figure 3A:
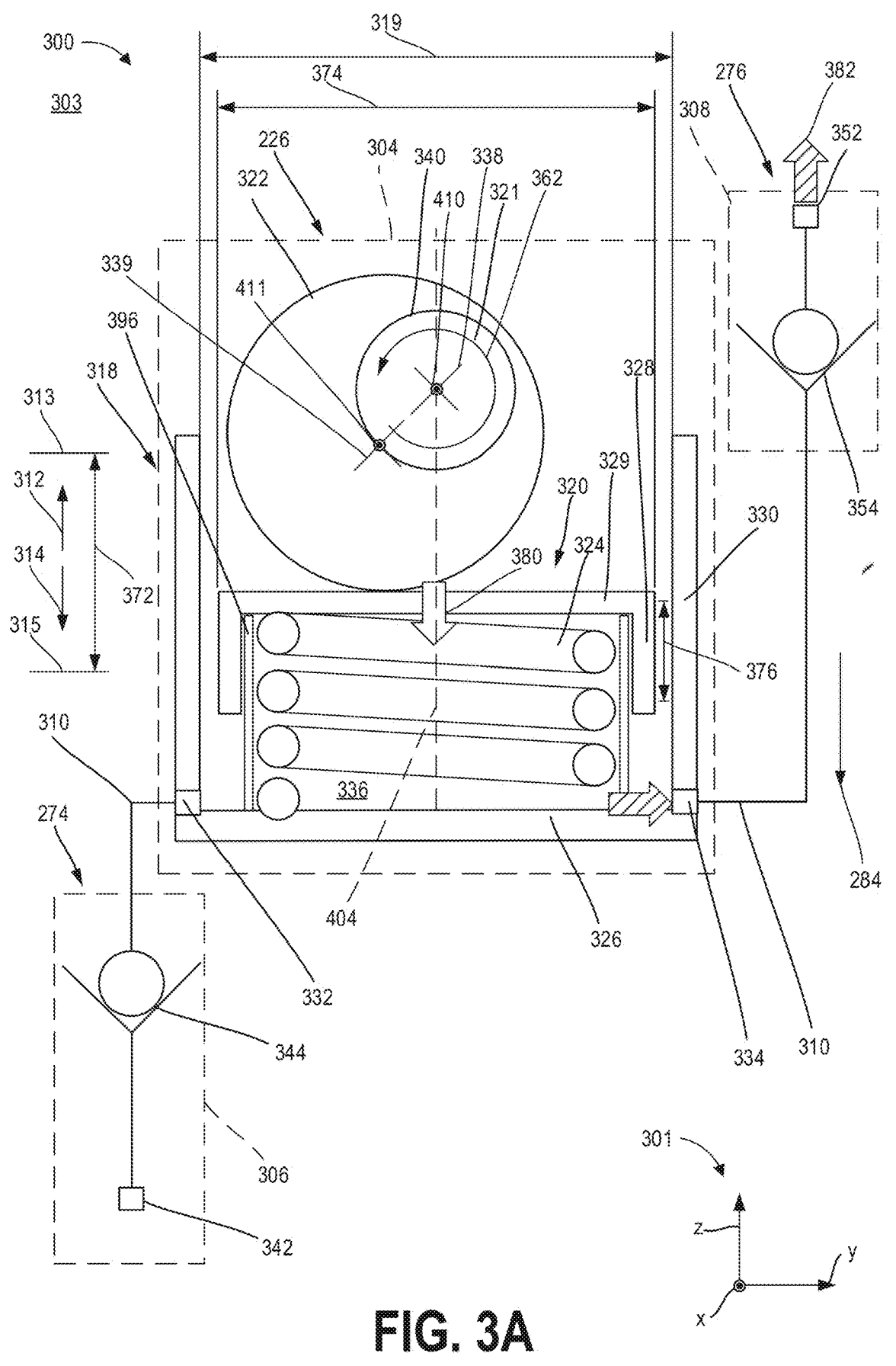
Figure 3B:
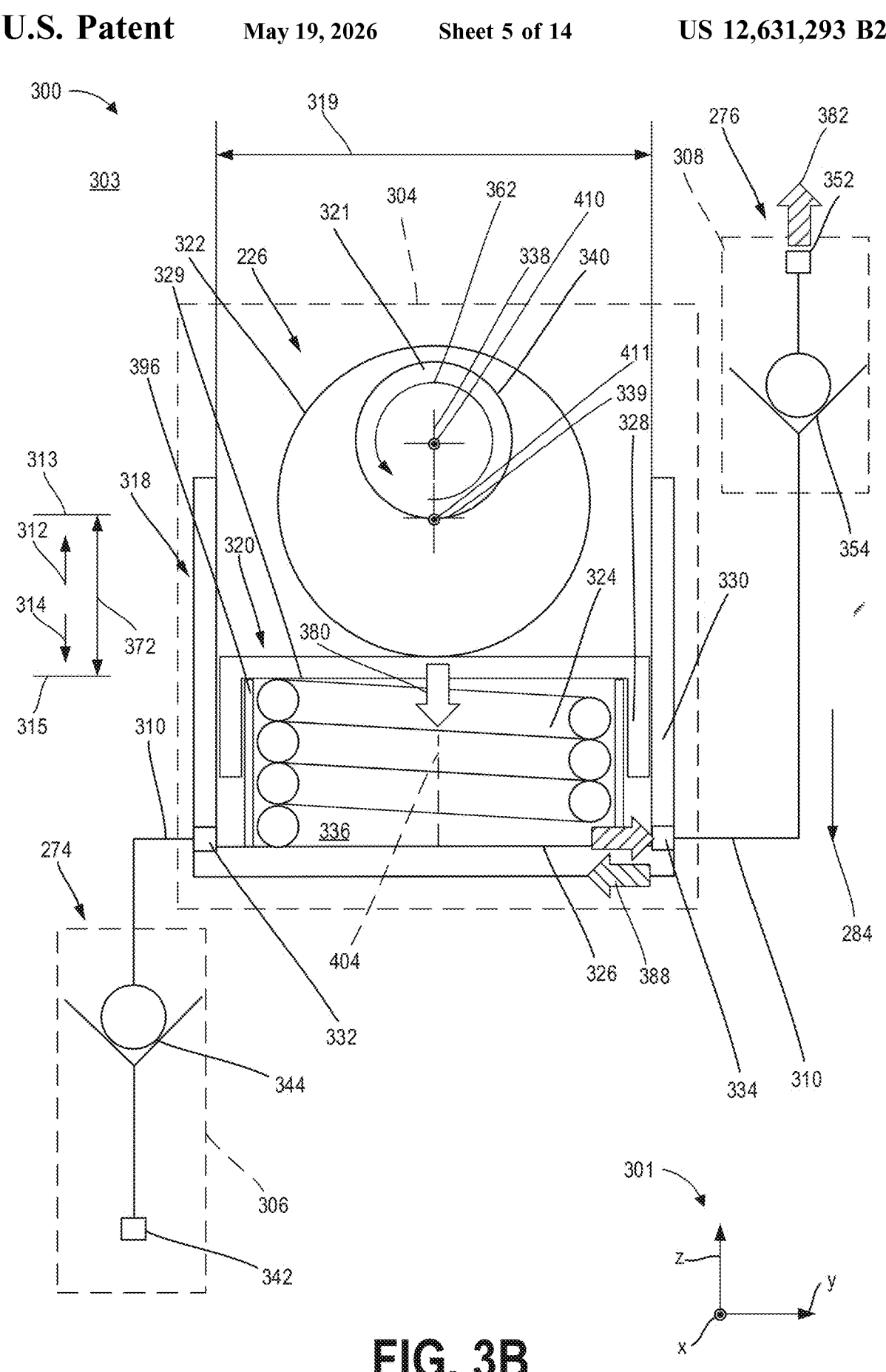
FIG. 3B shows the schematic of the mechanically driven pump system in a second position.
Figure 3C:
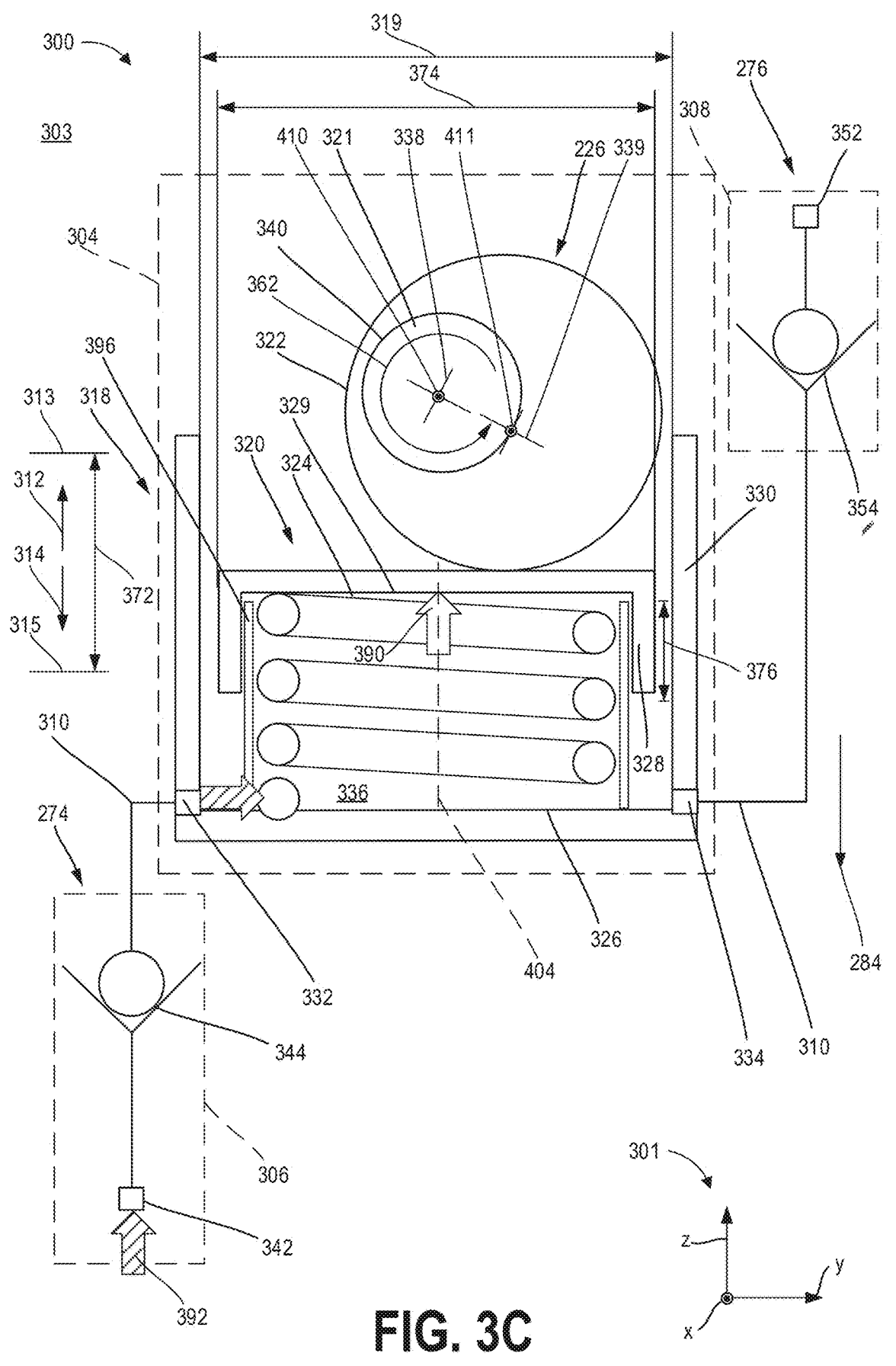
Figure 3D:
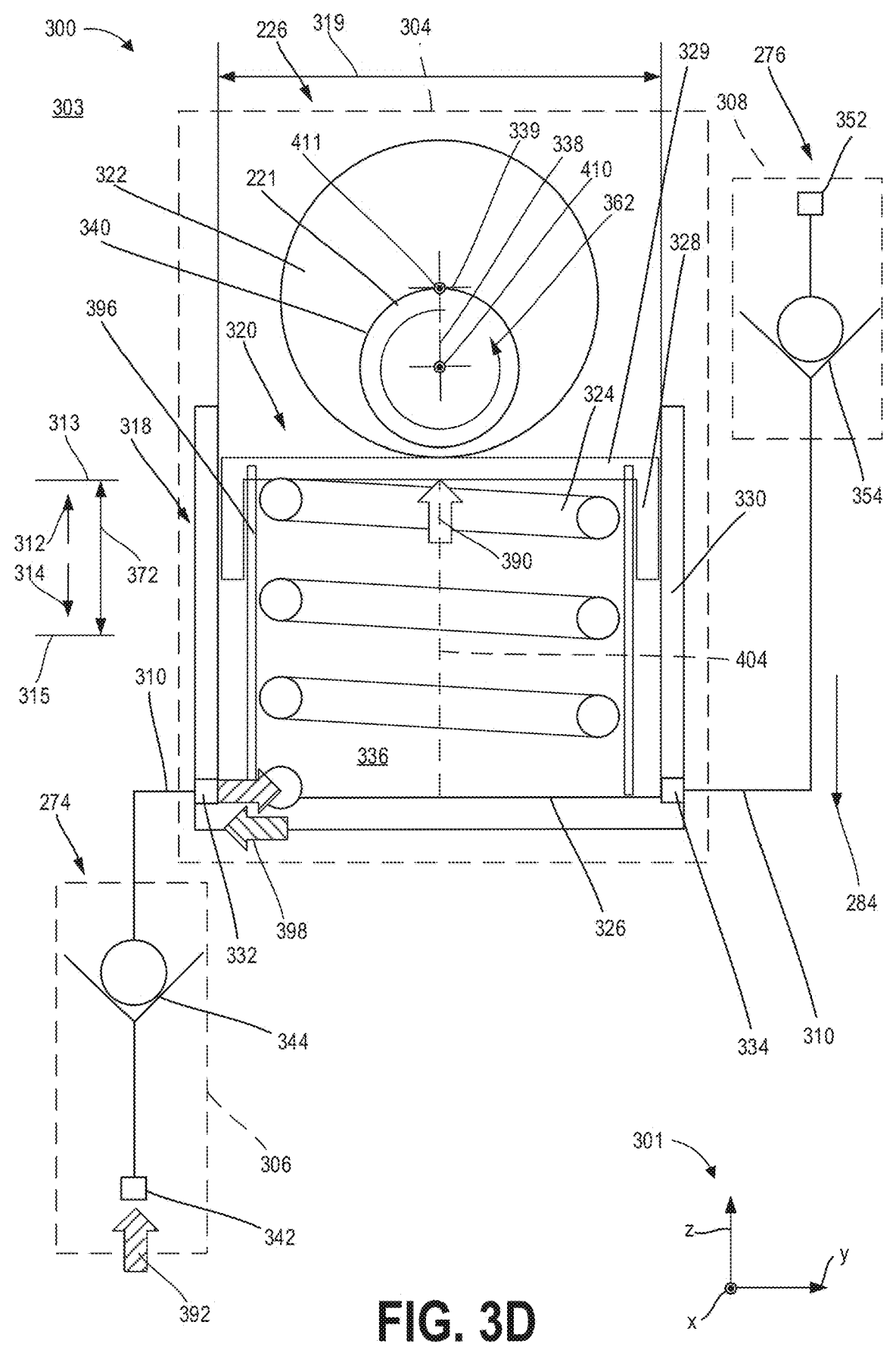
Figure 4:
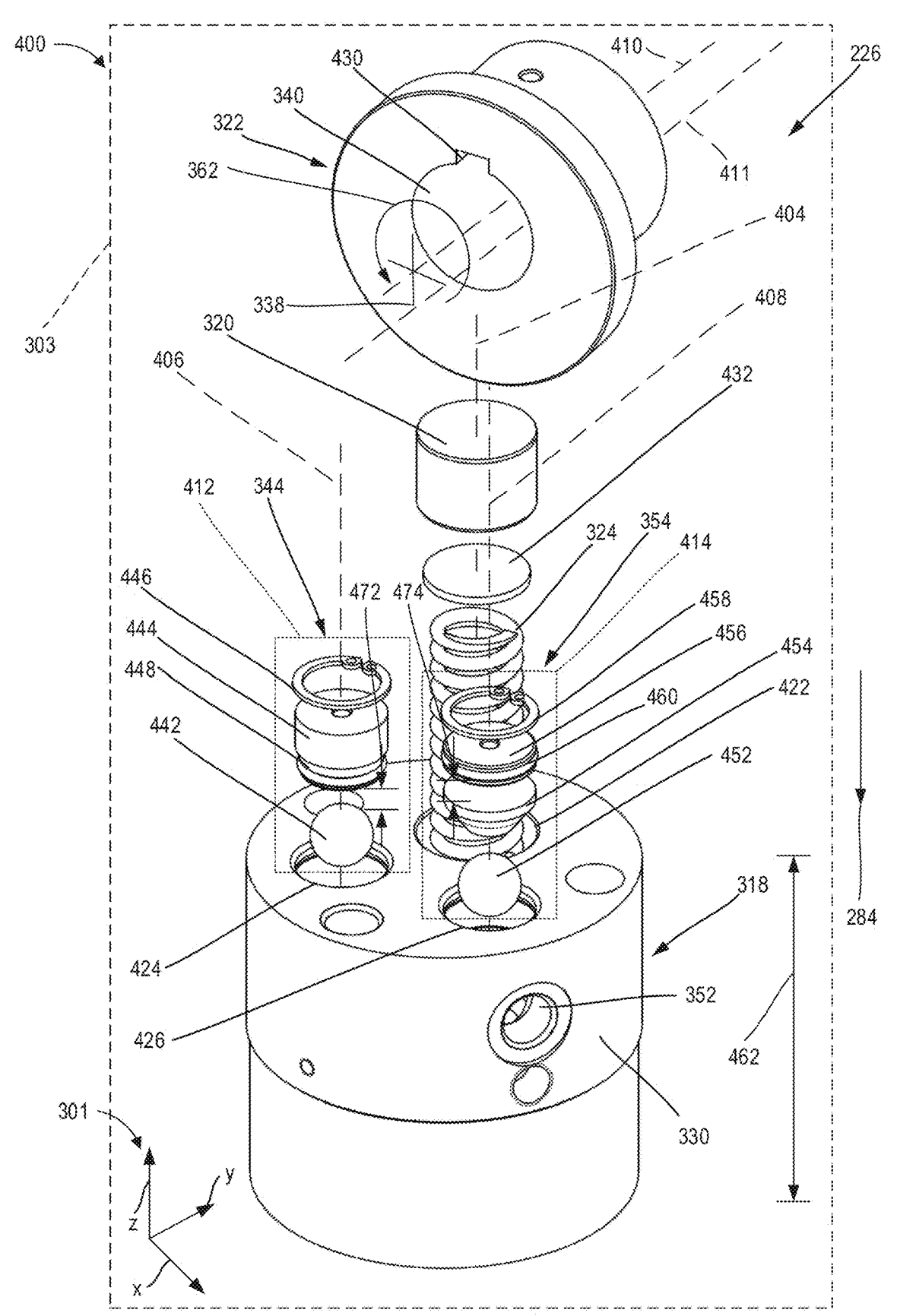
FIG. 4 is an exploded view of a configuration of a mechanically driven pump.
Figure 5:
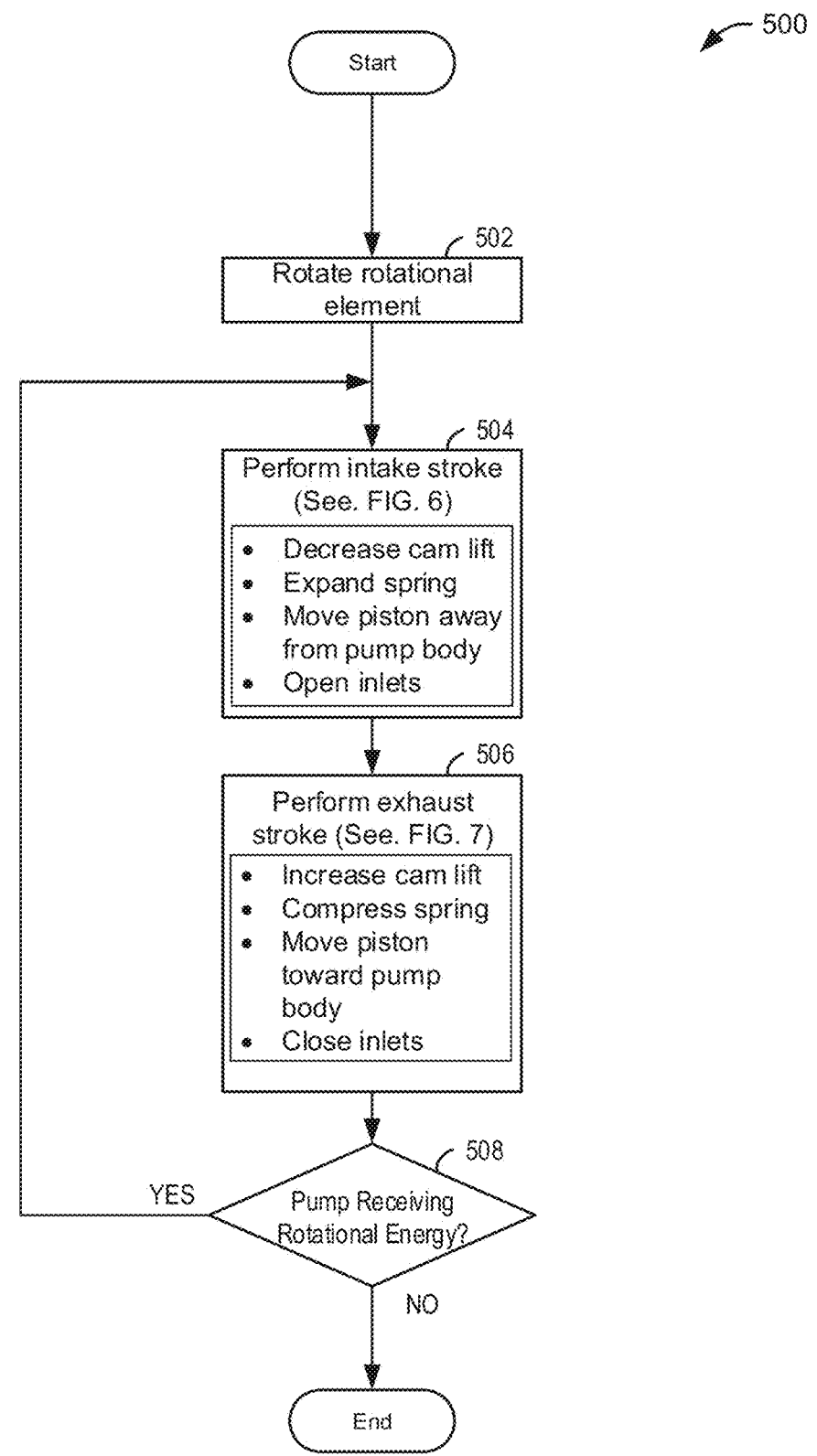
FIG. 5 shows a method for operating the mechanically driven pump.
Figure 6:
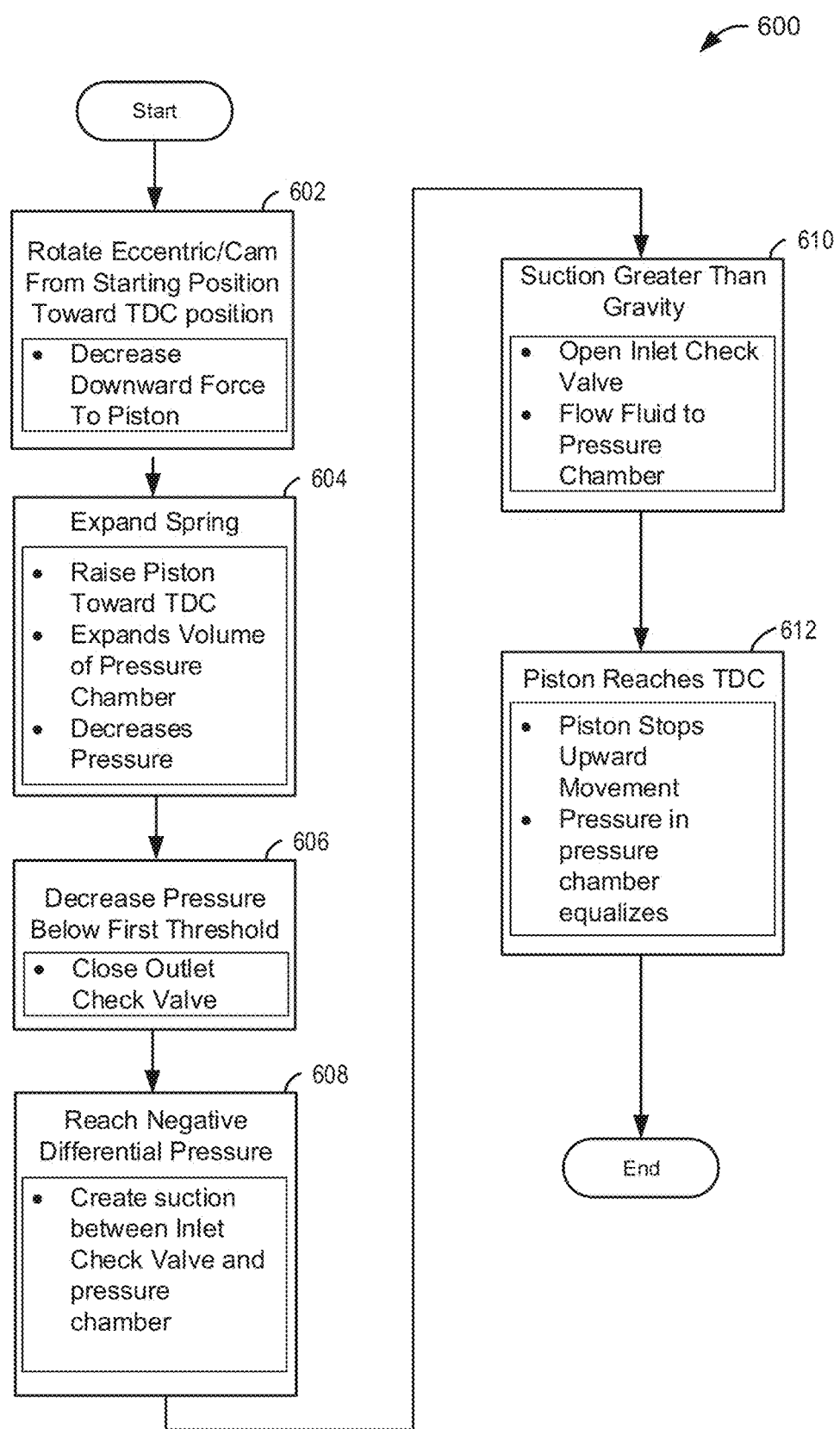
FIG. 6 shows a method for driving a piston of the mechanically driven pump for an expansion stroke.
Figure 7:
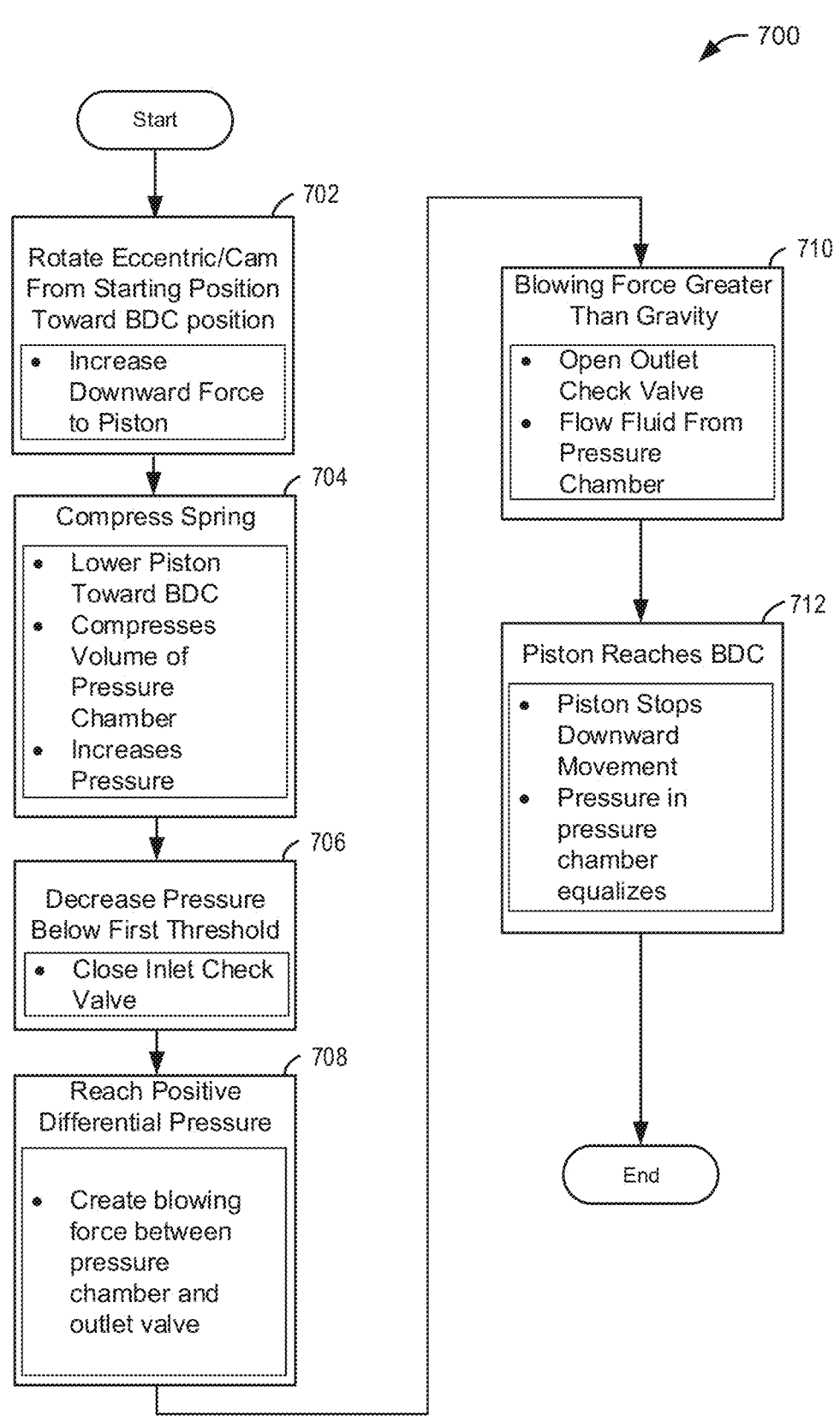
FIG. 7 shows a method for driving the piston of the mechanically driven pump for a compression stroke.
Figure 8:
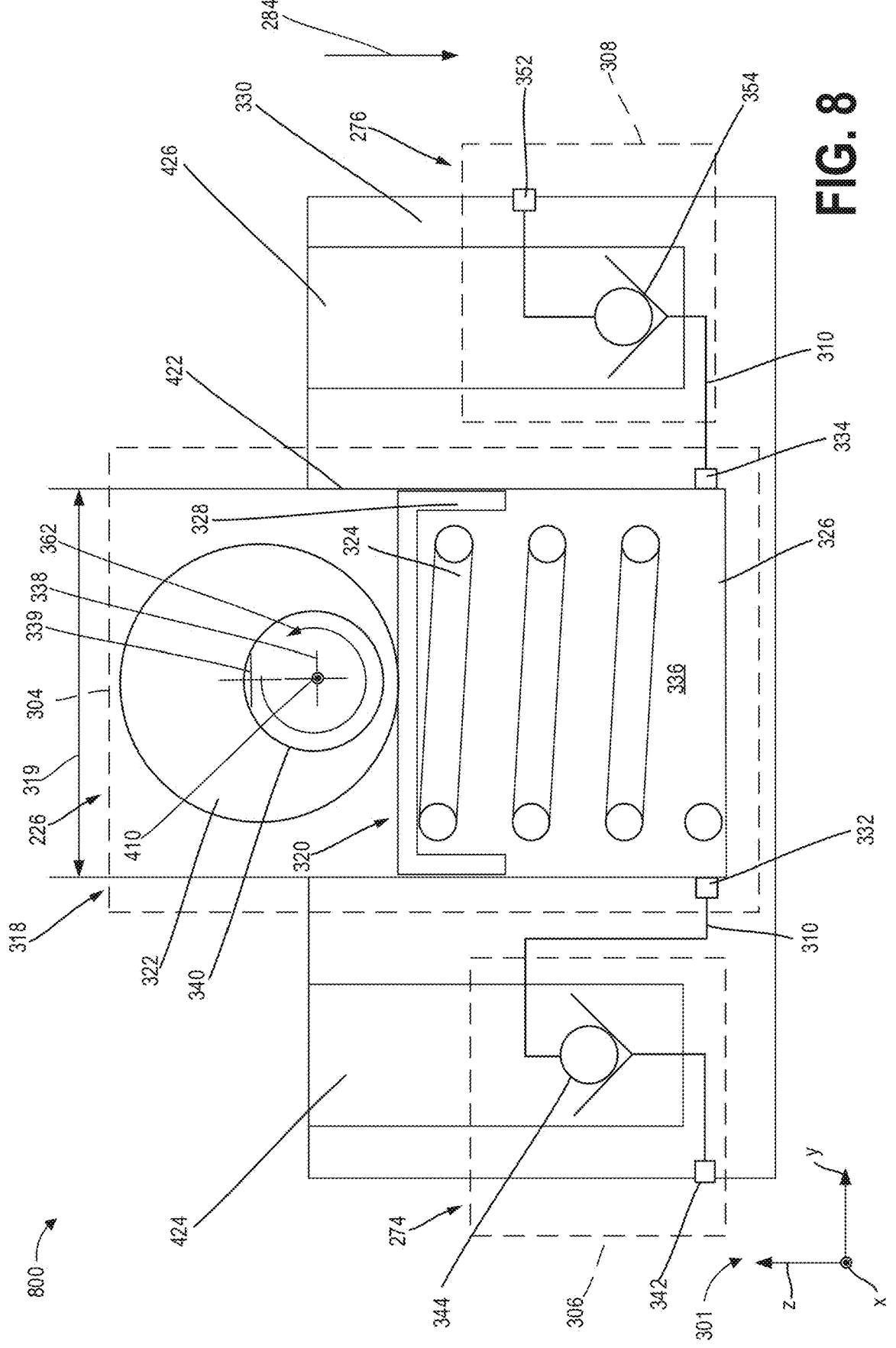
FIG. 8 shows a cross-sectional view of the pump, where an inlet check valve and an outlet check valve are housed by a wall of a pump body.
Figure 9:
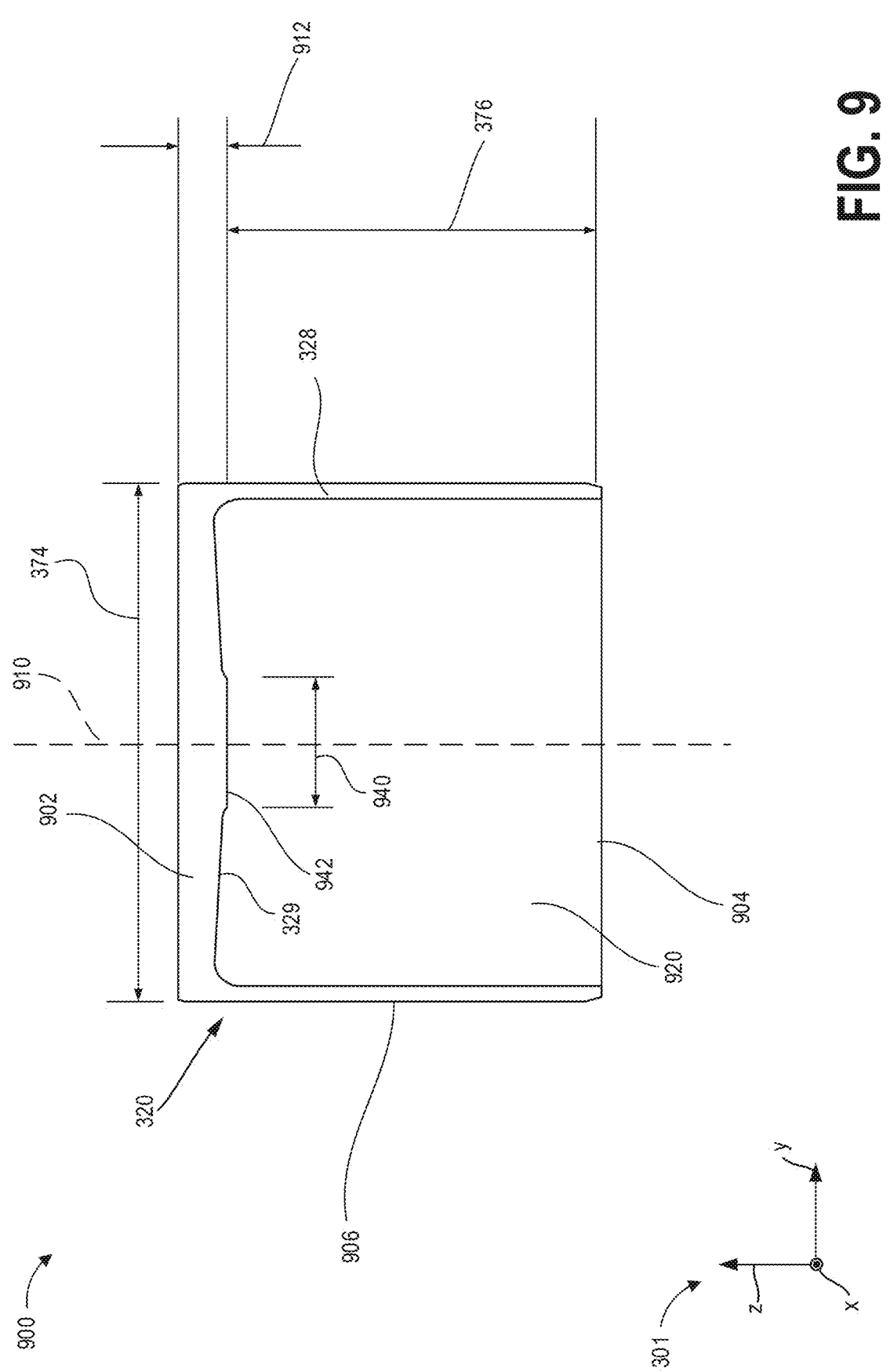
FIG. 9 shows a cross-sectional view of the piston for the mechanically driven pump.

FIG. 3A shows a schematic of a mechanically driven pump system, where a piston of the driven pump system is in a first position. The piston may be in the first position during a compression stroke. FIG. 3B shows the schematic of the mechanically driven pump system, where a piston of the driven pump system is in a second position. The piston may be in the second position at the end of the compression stroke or beginning of an expansion stroke. FIG. 3C shows the schematic of the mechanically driven pump system in a third position. The piston may be in the third position during the expansion stroke. FIG. 3D shows the schematic of the mechanically driven pump system in a fourth position. The schematic of the mechanically driven pump system of FIGS. 3A-3D at least has an inlet check valve and an outlet check valve, where fluid enters the pump via the inlet check valve and exits the pump via the outlet check valve. The piston may be in the first position at the end of the expansion stroke or beginning of the compression stroke. FIG. 4 is an exploded view of a configuration of a mechanically driven pump, showing the inlet check valve and outlet check valve are springless (e.g., lack springs). The inlet check valve and outlet check valve may be incorporated into the body of the pump, where the inlet and outlet check valves are housed by holes of the pump body. The inlet and outlet check valves are arranged vertically, such that the force of gravity passively closes the check valves when not open via hydraulic pressure. FIG. 5 shows a method a for operating the mechanically driven pump. FIG. 5 shows the steps of a pump cycle where the pump reciprocates between an expansion stroke and a compression stroke. FIG. 6 shows a method for driving a piston of the mechanically driven pump during the expansion stroke. FIG. 7 shows a method for driving the piston of the mechanically driven pump during the compression stroke. FIG. 8 shows a cross-sectional view of the pump, where an inlet check valve and an outlet check valve are housed by a wall of a pump body. FIG. 9 shows a cross-sectional view of the piston for the mechanically driven pump.

Figures 10A, 10B, 10C:
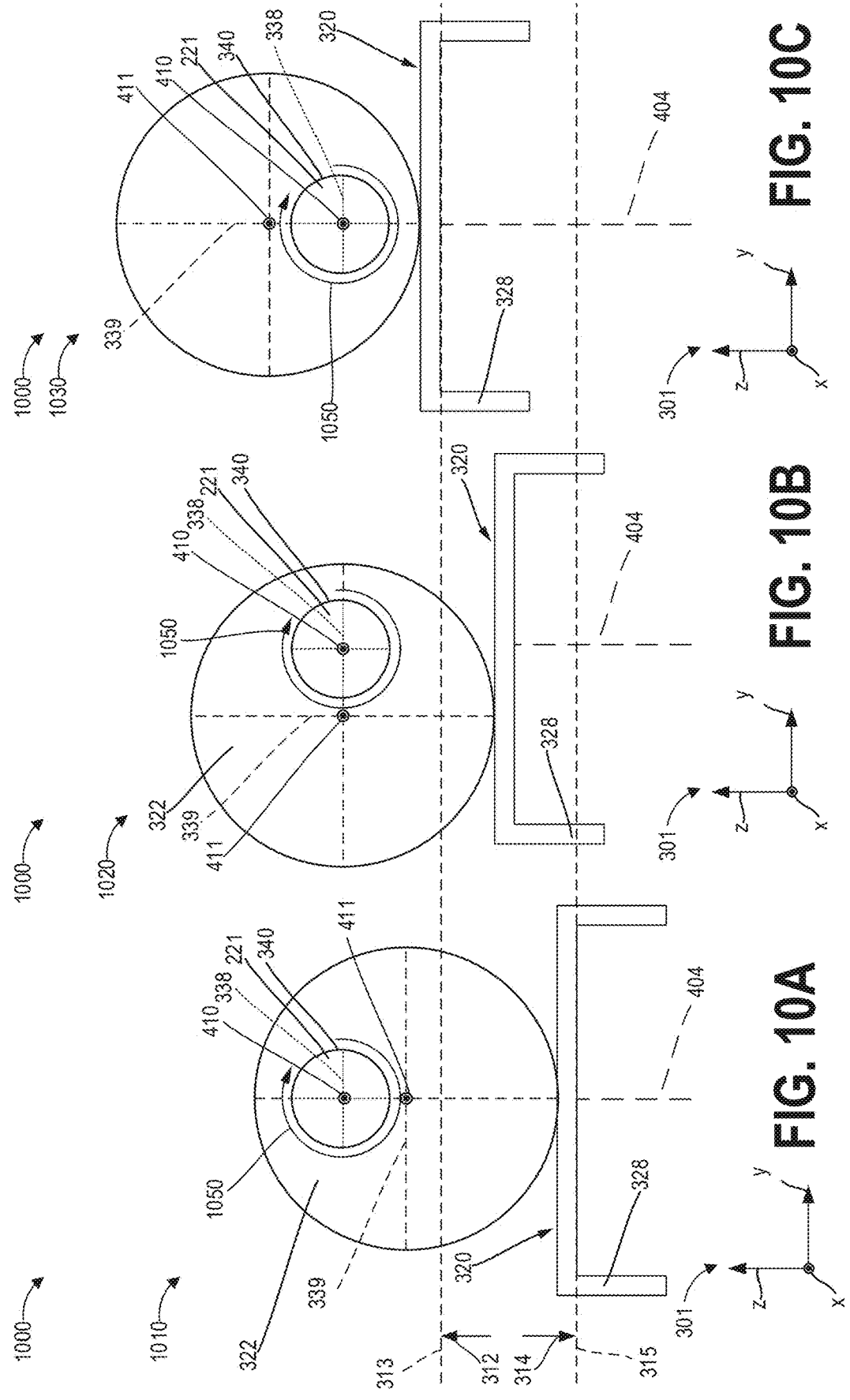
FIG. 10A shows the piston and a lobe of the pump at a first position.
FIG. 10B shows the piston and the lobe of the pump at a second position.
FIG. 10C shows the piston and the lobe of the pump at a third position.

FIG. 10A shows the piston and a lobe of the pump at a first position. The first position may be a bottom dead center (BDC) position, where the piston is at a BDC. FIG. 10B shows the piston and the lobe of the pump at a second position. FIG. 10C shows the piston and the lobe of the pump at a third position. The third position may be a top dead center (TDC) position, where the piston is at a TDC. The second position of FIG. 10B is at a stroke position, where the piston 320 is between the TDC and BDC. For an example, the second position may be a position during an expansion stroke.

FIG. 1 shows a vehicle 100 comprising a powertrain 101 and a drivetrain 103. The vehicle 100 may have a front end 102 and a rear end 104, located on opposite sides of vehicle 100. Objects, components, and features of the vehicle 100 referred to as being located near the front may be closest to the front end 102 compared to the rear end 104. Objects, components, and features of the vehicle 100 referred to as being located near the rear may be closest to the rear end 104 compared to the front end 102. The vehicle 100 may have a longitudinal axis 130. The powertrain 101 and drivetrain 103 may have a length parallel with the longitudinal axis 130.

The powertrain 101 comprises a prime mover 106 and a transmission 108. For an example, the prime mover 106 may be an internal combustion engine (ICE). For another example, the prime mover 106 may be an electric machine. The prime mover 106 is operated to provide rotary power to the transmission 108. The transmission 108 receives the rotary power produced by the prime mover 106 as an input, and the transmission 108 outputs rotary power to the drivetrain 103 in accordance with a selected gear or setting.

The vehicle 100 may be a commercial vehicle, light, medium, or heavy duty vehicle, a passenger vehicle, an off-highway vehicle, a commercial vehicle, agricultural vehicle, and/or sport utility vehicle. For an example embodiment, the vehicle 100 may be a wheeled vehicle, such as an automobile. However, additionally or alternatively, the vehicle 100 may be a plane, a boat, or other vehicle system. Additionally or alternatively, the vehicle 100 and/or one or more of its components, such as components of the powertrain 101 and/or the drivetrain 103, may be used in industrial, locomotive, military, agricultural, and/or aerospace applications. In an example, the vehicle 100 is an all-electric vehicle or a vehicle with all-electric modes of operation, such as a plug-in hybrid vehicle. As such, the prime mover 106 may be an electric machine, such as an electric motor/generator. For an example, the vehicle 100 may be a hybrid vehicle, wherein there are multiple torque inputs to the transmission 108. As such, there may be at least another mover with an input to the transmission 108 besides prime mover 106. If the prime mover is an ICE or another non-electric machine mover, the other mover may be an electric machine, such as an electric motor or an electric motor/generator. The vehicle 100 may have a driveshaft 122. The driveshaft 122 may be rotatably coupled to the transmission 108, such that the transmission 108 may rotate and drive the driveshaft 122.

The prime mover 106 may be powered via energy from an energy storage device 105. For example, the energy storage device 105 is a battery, such as a traction battery, configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The drivetrain 103 may include an axle assembly 112. The axle assembly 112 may be configured to drive a set of wheels 114. In one example, the axle assembly 112 is arranged near the rear of the vehicle 100 and thereby comprises a rear axle.

For another example, the axle assembly 112 may be arranged near the front of the vehicle 100 and thereby comprise a front axle. For another example, there may be an additional axle assembly arranged near the front of the vehicle 100 separate from the axle assembly 112. The additional axle assembly may be drivingly coupled to the transmission such as to be driven by the transmission 108 or another transmission. The vehicle 100 may include additional wheels that are not coupled to the drivetrain 103.

The transmission 108 may drivingly couple to the axle assembly 112 via the driveshaft 122. Said in another way, the transmission 108 may drivingly couple to the driveshaft 122, and the driveshaft 122 may drivingly couple the axle assembly 112. In some configurations, such as shown in FIG. 1, the drivetrain 103 includes a transfer case 110 configured to receive rotary power output by the transmission 108. The driveshaft 122 may drivingly couple to the transfer case 110 and may be drivingly coupled to the transmission 108 via the transfer case 110.

The axle assembly 112 may include a differential 116 and a first set of axle shafts. The differential 116 may drivingly couple the first set of axle shafts such as to transfer torque to and drive the first set of axle shafts. The differential 116 may distribute unequal torque to one or more wheels of wheels 114 drivingly coupled at opposite ends of the axle assembly 112. The differential 116 may therein distribute unequal torque to each wheel of the wheels 114.

The transmission 108 includes at least a mechanical system mechanical element, where the mechanical elements are capable of movement such as rotation and/or translation. The mechanical system may be a referred to herein as a mechanical assembly 132. The mechanical assembly 132 may be a geartrain comprising gearsets or another train comprising sets of different speeds/ratios. The mechanical assembly 132 may include an assembly of rotational elements, such as gears, shafts, and clutches. Likewise, the mechanical assembly 132 may include an assembly of translatable elements, such as clutches and shifting rods. Rotational energy from the prime mover 106 may drive the mechanical assembly 132, and the mechanical assembly 132 may drive on one or more shafts or other rotational elements rotatably coupled to the transmission 108. The mechanical assembly 132 may be one of a plurality of mechanical assemblies of vehicle 100, and therein may be referred to herein as the first mechanical assembly 132.

Additionally, the vehicle 100 may include other gearboxes, such as a gearbox 134 that is separate from the transmission. The gearbox 134 may include a second mechanical system of mechanical elements, where the mechanical elements are capable of movement such as rotation and/or translation. The second mechanical system may be referred to herein as a second mechanical assembly 136. The second mechanical assembly 136 may be a geartrain comprising gearsets or another train comprising sets of different speeds/ratios. The second mechanical assembly 136 may include an assembly of rotational elements, such as gears, shafts, and clutches. Likewise, the second mechanical assembly 136 may include an assembly of translatable elements, such as clutches and shifting rods. The gearbox 134 and the second mechanical assembly 136 may be or be part of a speed reduction system for the vehicle 100. Rotational energy from rotational elements of the drivetrain 103, such as downstream of the transmission 108, may drive the gearbox 134 via the second mechanical assembly 136. Likewise, one or more rotatory elements may be driven via the gearbox 134 and more specifically via rotatory elements of the second mechanical assembly 136. For example, the gearbox 134 may be downstream of the transmission 108 and upstream of the differential 116. The gearbox 134 and more specifically the second mechanical assembly 136 may be rotatably coupled to driveshaft 122 and the differential 116, such as to be driven by the driveshaft 122 and facilitate driving the differential 116. For another example, the gearbox 134 may be downstream of the differential 116 and upstream of either of the wheels 114. The gearbox 134 and more specifically the second mechanical assembly 136 may be drivingly coupled to the differential 116 and at least one of the wheels 114, such as to be driven via the differential 116 and facilitate driving of at least a wheel of the wheels 114.

The vehicle 100, and more specifically the drivetrain 103, may include a plurality of lubrication systems of the present disclosure, such as a first lubrication system 140. The transmission 108 may house and/or comprise the components and features of the first lubrication system 140. The first lubrication system 140 may be coupled to the first mechanical assembly 132, such as to be driven to generate hydraulic energy and fluid flow via one or more rotational elements of the first mechanical assembly 132. Further, the gearbox 134 may house and/or comprise the components and features a second lubrication system 142. The second lubrication system 142 may be coupled to the second mechanical assembly 136, such as to be driven to generate hydraulic energy and fluid flow via one or more rotational elements of the second mechanical assembly 136. The vehicle 100 and drivetrain 103 may include a third lubrication system 144. A housing of the drivetrain 103 may house and/or comprise the components and features the third lubrication system 144. The third lubrication system 144 may be coupled to one or more rotational elements, such as shafts or gears, of the drivetrain 103, such as to be driven to generate hydraulic energy and fluid flow via the rotational elements of the second the drivetrain 103.

A first arrow 172, a second arrow 174, and a third arrow 176 may each represent a fluid flow that includes lubricant transported via the first lubrication system 140, second lubrication system 142, and third lubrication system 144, respectively. The lubricant transported and housed via the first lubrication system 140, second lubrication system 142, and third lubrication system 144 via the may be a liquid fluid, such as oil. Fluid flow transported via the first arrow 172, the second arrow 174, and the third arrow 176 may also include gaseous fluid, such as air. The first lubrication system 140 may lubricate rotational elements, such as gears, shafts, clutches, and other components of the transmission 108 used to form ratios in a targeted manner. Likewise, the first lubrication system 140 other elements capable of movement, such as shifting rods, of the transmission 108 in a targeted manner. For example, the first lubrication system 140 may provide targeted lubrication to elements, components, and features of the first mechanical assembly 132, as shown by the first arrow 172. The second lubrication system 142 may lubricate rotational elements, such as gear, shafts, clutches, and other components of the gearbox 134 used to form ratios in a targeted manner. Likewise, second lubrication system 142 may lubricate other elements capable of movement, such as shifting rods of the gearbox 134, in a targeted manner. For example, the second lubrication system 142 may provide targeted lubrication to elements, components, and features of the second mechanical assembly 136 as shown by the second arrow 174. The third lubrication system 144 may provide targeted lubrication to elements, components, and features of the drivetrain 103. For example, the third lubrication system 144 may provide targeted lubrication to the driveshaft 122 as shown by the third arrow 176.

Adjustment of the drivetrain 103 between the various modes of operation as well as control of operations within each mode may be executed based on a vehicle control system 154, including a controller 156. Controller 156 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 156 may be a powertrain control module (PCM).

Controller 156 may receive various signals from sensors 158 coupled to various regions of vehicle 100. For example, the sensors 158 may include sensors at the prime mover 106 or another mover to measure mover speed and mover temperature, a pedal position sensor to detect a depression of an operator-actuated pedal, such as an accelerator pedal or a brake pedal, a lever position sensor to detect a shifting of a lever, such as a brake lever, speed sensors at the wheels 114, a plurality liquid fluid level sensor to detect fluid height in one or more sumps and/or reservoirs, a plurality of pressure sensors to estimate pressure and fluid flow through fluid lines, etc. The first lubrication system 140, the second lubrication system 142, and the third lubrication system 144 may include one or more pumps and/or reservoirs monitored by the fluid level sensors and fluid lines monitored by the pressure sensors. Upon receiving the signals from the various sensors 158 of FIG. 1, controller 156 processes the received signals, and employs various actuators 160 of vehicle 100 to adjust drivetrain operations based on the received signals and instructions stored on the memory of controller 156. For example, controller 156 may receive an indication of depression of the brake pedal, signaling a desire for decreased vehicle speed. Vehicle braking may be directly proportional to accelerator pedal position, for example, degree of depression. For another example, controller 156 may receive an indication of depression of the accelerator pedal, signaling a desire for increased vehicle speed. Vehicle acceleration may be directly proportional to accelerator pedal position, for example, degree of depression. In response, the controller 156 may command operations, such as shifting gear modes of the transmission 108. Alternatively, the gear modes of the transmission 108 may be shifted manually, such as if the transmission 108 is a manual transmission.

The transmission 108 may be a gearbox. Alternatively, the transmission 108 may be an axle transmission or a trans axle transmission, and may be arranged or be part of an axle assembly such as the axle assembly 112. In some embodiments, additionally or alternatively, the transmission 108 may be a first transmission, and the vehicle 100 may have a second transmission. The second transmission may be arranged nearer to the rear side or in another position of the vehicle 100 compared to transmission 108.

The drivetrain 103 is shown in a rear-wheel drive configuration, although other configurations are possible. For one or more examples, the drivetrain 103 may include a front-wheel drive, a four-wheel drive configuration, or an all-wheel drive configuration. Further, the drivetrain 103 may include one or more tandem axle assemblies. For example, there may be one or more axle assemblies in addition to axle assembly 112, and there may be one or more axles in addition to the axle of axle assembly 112. As such, the drivetrain 103 may have other configurations without departing from the scope of this disclosure, and the configuration shown in FIG. 1 is provided for illustration, not limitation. For example, in some embodiments, additionally or alternatively, the transmission 108 may be a first transmission, and the vehicle 100 may have a second transmission arranged on the second set of axle shafts. The transmission 108 may be a gearbox. Alternatively, the transmission 108 may be an axle transmission or a trans axle transmission.

FIG. 2A shows a schematic of a first configuration of an assembly that includes a pump of the present disclosure, referred to herein as a first assembly 200. The first assembly 200 comprises a first lubrication system 212 and a mechanical system 216. The first lubrication system 212 is an active lubrication system, including at least a scavenger pump and another pump, such as a second pump 228. The other pump, such as the second pump 228, may be used for transporting and pressurizing fluid for targeted lubrication of components and features of the mechanical system 216 from a calm reservoir, such as a calm reservoir 224.

The first lubrication system 212 may be or be a part of the first lubrication system 140, the second lubrication system 142, or the third lubrication system 144 of FIG. 1. The mechanical system 216 may be an assembly comprising a plurality of rotational elements and translating elements, and may comprise a geartrain. The mechanical system 216 may be or be part of the first mechanical assembly 132, the second mechanical assembly 136, or another mechanical assembly of the driveline of the 103 of FIG. 1.

FIG. 2B shows a schematic of a first configuration of an assembly that includes a pump of the present disclosure, referred to herein as a second assembly 280. The second assembly 280 comprises a second lubrication system 282 and the mechanical system 216. The second lubrication system 282 comprises at least a scavenger pump that is a pump of present disclosure. The second lubrication system 282 lacks a pump for pressurizing and delivering fluid to the mechanical system 216 from a calm reservoir, such as the calm reservoir 224. The second lubrication system 282 lacks a pump for removing fluid from the calm reservoir 224. The second assembly 280 and second lubrication system 282 are passive assemblies, removing lubricant passively from the calm reservoir 224 via passive forces, such as via gravity. The force of gravity may be represented by an arrow 284.

The second lubrication system 282 may be or be a part of the first lubrication system 140, the second lubrication system 142, or the third lubrication system 144 of FIG. 1.

The components and features of FIGS. 2A-2B may be referred to herein interchangeably.

The first and second lubrication systems 212, 282 may transport and pressurize lubricant 230. Lubricant 230 may be oil.

The first lubrication system 212 and the second lubrication system 282 may comprise a housing 214. The housing 214 may be a housing of or part of another fixed feature or component of a transmission, a gearbox, or a drivetrain. For example, the housing 214 may be part of the transmission 108 or the gearbox 134 of FIG. 1, or a housing or feature of the drivetrain 103 of FIG. 1. The first lubrication system 212 and the second lubrication system 282 may include a dry sump 222 and the calm reservoir 224. Lubricant 230 may be housed and/or transported through the dry sump 222 and calm reservoir 224. Flow of lubricant 230 through the first and second lubrication systems 212, 282 may be represented by a plurality of arrows 272.

The dry sump 222 may fluidically couple to a mechanically driven pump 226, where the mechanically driven pump 226 is downstream of the dry sump 222. Additionally, the calm reservoir 224 may fluidically couple to the mechanically driven pump 226, where the mechanically driven pump 226 is upstream of the calm reservoir 224. Said in another way, the dry sump 222 may be placed in fluid communication with the calm reservoir 224 via the mechanically driven pump 226, where the dry sump 222 is on the suction side of the mechanically driven pump 226, and the calm reservoir 224 is on the pressure side of the mechanically driven pump 226. The mechanically driven pump 226 may be the scavenger pump of the dry sump 222.

In the first assembly 200 and the first lubrication system 212, the calm reservoir 224 may fluidically couple to the second pump 228, where the second pump 228 is downstream of the calm reservoir 224. Additionally, in the first assembly 200 and the first lubrication system 212, one or more components and features of the mechanical system 216 may fluidically couple to the second pump 228, where the second pump 228 is upstream of the mechanical system 216. Said in another way, the calm reservoir 224 may be placed in fluid communication with the mechanical system 216 via the second pump 228, where calm reservoir 224 is on the suction side of the second pump 228, and the mechanical system 216 is on the pressure side of the second pump 228.

The mechanical system 216 may include a plurality of rotational elements including a first rotational element 242 and a second rotational element 244. The first rotational element 242 and the second rotational element 244 may be parallel. The mechanical system 216 may include or be rotationally coupled to a third rotational element 246, such that the third rotational element 246 may be driven by one or more rotational elements of the mechanical system 216. For example, the third rotational element 246 may be rotated via a take-off of the mechanical system 216. The takeoff may include a gearset or another reduction set that may be driven via a rotational element of the mechanical system 216.

The first rotational element 242, the second rotational element 244, and the third rotational element 246 may be shafts. At least either the first or second rotational element 242, 244 may be driven via and receive rotational energy, such as via torque, from a mover. For example, the prime mover 106 of FIG. 1 may drive either the first or second rotational element 242, 244. The third rotational element 246 and by extension the mechanically driven pump 226 may be driven with the absence of a dedicated mover. Said in another way, the third rotational element 246 and by extension the mechanically driven pump 226 may be only driven via a mover that drives the mechanical system 216, such as a mover that drives the first rotational element 242 or the second rotational element 244.

The motion source for the mechanically driven pump 226 is the mechanical system 216, itself. For example, the third rotational element 246 may be coupled to the mechanically driven pump 226, such as to provide rotational energy to and drive the mechanically driven pump 226. The third rotational element 246 may therein be motion source for the pumping action of the mechanically driven pump 226. Said in another way, when driven via the third rotational element 246, the mechanically driven pump 226 may generate suction. The pumping cycle may be proportional to the rotational speed of the third rotational element 246, where the increase in rotary speed of the third rotational element 246 may increase rates of reciprocation for the mechanically driven pump 226. Increasing rotational speed of the third rotational element 246 may therein increase the rate of fluid flow through and pressure output by the mechanically driven pump 226. The third rotational element 246 may have maximum angular speed between 1500 and 4000 revolutions per minute (RPM).

The first rotational element 242, the second rotational element 244, and the third rotational element 246 may be shafts.

The mechanical system 216 includes at least a gearset 252. The gearset 252 is surrounded by a plurality of dashed lines 254 arranged in a rectangle for visual clarity. The gearset 252 includes at least two gears, a first gear 262 and a second gear 264. However, it is to be appreciated that there may be additional gears in mesh with the first gear 262 and the second gear 264, where the additional gears may include one or more idler gears arranged in mesh with and between the first gear 262 and the second gear 264. The mechanical system 216 includes a disconnect assembly 248 that may selectively couple the first rotational element 242 to the first gear 262 of the gearset 252. The disconnect assembly 248 may be a clutch assembly including a clutch, such as a wet clutch. A bearing assembly 266 may be positioned radially between the first gear 262 and the first rotational element 242. The bearing assembly 266 may support the first gear 262, such that the first gear 262 may rotate independently of the first rotational element 242. The second rotational element 244 may rigidly couple another gear of the gearset 252.

One or more of components and features of the mechanical system 216 may receive targeted lubrication from the first lubrication system 212 or the second lubrication system 282. Said in another way, the first lubrication system 212 or the second lubrication system 282 may deliver lubricant 230 to the one or more components of the mechanical system 216. For a first set of examples, lubricant may be delivered via the first lubrication system 212 to a component and/or feature of the mechanical system 216 via the second pump 228. The second pump 228 uptakes lubricant from the calm reservoir 224. For a second set of examples, lubricant may be delivered via the second lubrication system 282 to a component and/or feature of the mechanical system via the force of gravity acting on the calm reservoir 224.

For an example, the first lubrication system 212 may provide targeted lubrication to a gear mesh 268 between gears of the gearset 252 as shown by the arrows 272. The gear mesh 268 may be between the first gear 262 and the second gear 264, and may be surrounded by a plurality of dotted lines 270 arranged in a rectangle for visual clarity. For this or another example, the first lubrication system 212 may provide targeted lubrication to the disconnect assembly 248 as shown by the arrows 272. For these or another example, the first lubrication system 212 may provide targeted lubrication to the actuator 250 as shown by the arrows 272. For these or another example, the first lubrication system 212 may provide targeted lubrication to the bearing assembly 266 as shown by the arrows 272.

Lubricant 230 may be cycled back to the dry sump 222 after lubricating components or features of the mechanical system 216 as shown by the arrows 272. The mechanically driven pump 226 may suck and pressurize lubricant 230 from the dry sump 222 as shown by the arrows 272. Additionally, the mechanically driven pump 226 may suck and pressurize gaseous fluid, such as air, with the lubricant 230 from the dry sump. The mechanically driven pump may pass lubricant 230 to the calm reservoir 224 as shown by the arrows 272. The rate of suction of lubricant 230 from the dry sump 222 and fluid flow through the mechanically driven pump 226 may be proportional to the rotational speed of the third rotational element 246.

The mechanically driven pump 226 includes an inlet check valve system 274 and an outlet check valve system 276 each incorporating a check valve. The inlet check valve system 274 may open the mechanically driven pump 226 to the dry sump 222. Said in another way, the inlet check valve system 274 may place the mechanically driven pump 226 in fluid communication to the dry sump 222. The outlet check valve system 276 may open the mechanically driven pump 226 to the calm reservoir 224. Said in another way, the outlet check valve system 276 may place the mechanically driven pump 226, and by extension the dry sump 222, in fluid communication to the calm reservoir 224. The inlet check valve system 274 may open during an expansion stroke of the mechanically driven pump 226. The outlet check valve system 276 may open during the compression stroke of the mechanically driven pump 226.

A set of reference axes 301 are provided for comparison between views shown in FIGS. 3A-4, and FIGS. 8-10C. The reference axes 301 indicate a y-axis, an x-axis, and a z-axis. In one example, the z-axis may be parallel with a direction of gravity and the x-y plane may be parallel with a horizontal plane that the mechanically driven pump 226 may rest upon. The direction of gravity may be represented via arrow 284 as in FIGS. 2A-4 and FIG. 8. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view FIG. 3A-3D shows a schematic 300 of a pump system including the mechanically driven pump 226, the inlet check valve system 274, and the outlet check valve system 276. The schematic is a cross-section. The components of the mechanically driven pump 226 are surrounded by a plurality of first dashed lines 304 arranged in a rectangle for visual clarity. The components of the inlet check valve system 274 are surrounded by a plurality of second dashed lines 306 arranged in a rectangle for visual clarity. The components of the outlet check valve system 276 are surrounded by a plurality of third dashed lines 308 arranged in a rectangle for visual clarity. The mechanically driven pump 226 may be fluidly coupled to the inlet check valve system 274 and the outlet check valve system 276 via a plurality of fluid couplings 310. Said in another way, the mechanically driven pump 226 may be placed in fluid communication with the inlet check valve system 274 and the outlet check valve system 276 via the fluid couplings 310. It is to be appreciated, that the mechanically driven pump 226 may include (e.g., comprise) one, more, or all components of the inlet check valve system 274 and/or the outlet check valve system 276.

The mechanically driven pump 226, the inlet check valve system 274, and the outlet check valve system 276 may be housed in an enclosed environment 303. The enclosed environment 303 may be a gearbox, transmission, axle, differential, or other area where lubrication is provided to gears, sliding surfaces, etc. For example, the enclosed environment 303 may be part of or within the housing 214 of FIGS. 2A-2B.

Mechanically driven pump 226 has few parts and it may operate absent a controller. The mechanically driven pump 226 comprises at least a piston 320, a spring 324, a pump body 318, a lobe 322 that may be an eccentric or cam. The mechanically driven pump 226 may also comprise check valves of the inlet check valve system 274 and the outlet check valve system 276, respectively. The mechanically driven pump 226 may include a filter 396 and/or other parts to mediate contact between the spring 324 and the other components. The filter 396 and the other parts for mediating may overcome the technological limits of the manufacturing but are non-essential to the disclosure. The mechanically driven pump 226 is a two stroke pump that may generate flow through the outlet check valve system 276 whether the lobe 322 rotates clockwise or counter-clockwise.

The spring 324 and the piston 320 are configured to slide into a hole of the pump body 318 represented and indicated by arrows 319. The hole represented by arrows 319 may be a cavity of the pump body 318 and may be cylindrical in shape and volume. The hole represented by arrows 319 may be centered, such as radially around, the first axis 404. Likewise, the piston 320 and spring 324 are configured to be centered, such as radially around, the first axis 404. The first axis 404 may be a vertical axis with respect to the reference axes 301. The hole represented and indicated by arrows 319 may be a bore, where the hole is machined into the pump body 318. The pump body 318 may comprise a side wall 330 and a surface 326 forming a perimeter around the hole of arrows 319. The side wall 330 may curve radially around the hole, and the side wall 330 may be cylindrical in shape. The side wall 330 may include a surface facing and curving radially around the hole represented via arrows 319. The surface of the side wall 330 surrounding the hole represented via arrows 319 may be cylindrical in shape. The surface 326 may be flat. The surface 326 may be part of a bottom wall, a base, or another block feature of the pump body 318.

The piston 320 is cylindrical in shape and includes a cavity, and the cavity may be a cavity that is shown in FIG. 9. The cavity may be wrapped by a skirt 328 of the piston 320, where the skirt 328 curves around the cavity. The skirt 328 may be cylindrical in shape. The cavity is configured to accept the spring 324. The spring 324 may contact and provide a spring load to the piston 320.

A first end of the spring 324 is in direct contact with pump body 318 and a second end of spring 324 is in direct contact with a surface of an interior top wall 329 of piston 320, where the first end is opposite the second end. More specifically, the first end of the spring 324 may contact the surface 326. The spring 324 may press directly against the piston 320, forcing the piston 320 against the lobe 322. The stiffness of the spring 324 may be chosen based on the maximum acceleration of, the mass of, and the force exerted/applied to the piston 320. The acceleration of the piston 320 and force exerted to the piston 320 may be dependent on firstly the angular speed of the shaft 321 and the lobe 322, and secondly the stroke of the lobe 322 and the piston 320 represented by arrows 372. For an example, the maximum rotational speed of shaft 321 may be at or below a threshold of rotational speed. For example, the threshold of rotational speed is 1500 RPM. For another example, the threshold of rotational speed is 4000 RPM. The stroke of the lobe 322 represented by arrows 372 may be 10 millimeters. The piston 320 may have a mass of 32 grams. The spring 324 may have a minimum spring stiffness (e.g., a threshold of stiffness that the spring 324 may be greater than or equal to) of 4000 newtons/meter.

An operating sequence is shown via FIGS. 3A-3D, where the mechanically driven pump 226 is illustrated at different positions while reciprocating through expansion and compression strokes. In the sequence of FIGS. 3A-3D, a piston 320 moves radially with respect to a rotational center 338 and the lobe 322 rotates in a first direction indicated by arrow 362. The first direction indicated by arrow 362 may be counter-clockwise. The piston 320 may be translated between a top dead center (TDC) 313 and a bottom dead center (BDC) 315. The piston 320 may be translated in a first direction represented by an arrow 312 toward the TDC 313 and away from the BDC 315. The piston 320 may be translated in a second direction represented by an arrow 314 away from the TDC 313 and toward the BDC 315. The first direction represented by arrow 312 may be in an upward direction and the TDC 313 may be in a top most position relative to the mechanically driven pump 226. A distance between the TDC 313 and the BDC 315 may be a piston stroke of the piston 320, and the distance of the piston stroke may be represented via arrows 372. The spring 324 may prevent the piston 320 from being pushed lower than the BDC 315 and may prevent contact between the piston and the surface 326.

FIG. 3A shows the mechanically driven pump 226 is configured such that the piston 320 is at a first position between a top dead center (TDC) and a bottom dead center (BDC). At the first position, the piston 320 may be in the middle of an outtake stroke of a stroke cycle and moving toward the BDC 315. FIG. 3B shows the mechanically driven pump 226 configured such that the piston 320 is at a second position, where the piston 320 is at a BDC 315. At the second position, the piston 320 may be at the end of a compression stroke or at the beginning of an expansion stroke of a stroke cycle. Said in another way, at the second position, the piston 320 may be reciprocating between the outtake stroke and the expansion stroke of a pumping method. FIG. 3C shows mechanically driven pump 226 configured such that the piston 320 in a third position, where the piston 320 is between the TDC 313 and the BDC 315. At the third position, the piston 320 may be in the middle of an expansion stroke of a stroke cycle and moving toward the TDC 313. FIG. 3D shows the pump and more specifically the piston 320 in a fourth position, where the piston 320 is at the BDC 315. At the fourth position, the piston 320 may be in the end of an expansion stroke or at the beginning of a compression stroke of a stroke cycle. Said in another way, at the fourth position, the piston 320 may be reciprocating between an expansion stroke and an outtake stroke of a pumping method. The operating sequence may also be summarized and visualized as a method 500 of FIG. 5.

The mechanically driven pump 226 has a high ratio of displacement over clearance volume (e.g., greater than a ratio of 5 and lower than a ratio of 15), therein the mechanically driven pump 226 is self-priming. The clearance volume is the volume between a nearest check valve of the inlet check valve system 274 and another nearest check valve of the outlet check valve system 276 when the piston 320 is resting at the BDC 315. The displacement volume is the volume between a nearest check valve of the inlet check valve system 274 and another nearest check valve of the outlet check valve system 276 when the piston 320 is at the TDC 313 minus the clearance volume, represented by equation 1.

$$V_{Displacement} = V_{TDC} - V_{Clearance}. \qquad 1$$

Where $V_{Displacement}$ is the displacement volume, $V_{TDC}$ is volume when the mechanically driven pump 226 is at the TDC 313, and $V_{Clearance}$ is the clearance volume. The clearance volume and displacement volume are comprised by the volume of the hole represented by arrows 319.

Said in another way the displacement volume or $V_{Displacement}$, may be a cross-sectional area of a surface of the piston 320 (e.g., a piston area) multiplied by the distance of the displacement represented by arrows 372. The displacement represented by 372 is the distance piston stroke or the distance the piston travels. The cross-sectional area of the piston 320 may be the area of an interior surface of the interior top wall 329. $V_{Displacement}$ may also be represented by equation 2.

$$v_{Displacement} = A_{Piston} - d_{stroke}. \qquad 2$$

Where $A_{Piston}$ is the cross-sectional area of the piston and $d_{stroke}$ is the distance of the stroke and the distance of the displacement represented by arrows 372.

The displacement volume may therein be the volume of the space the piston stroke represented via arrows 372 extends through.

Energy may be transferred to the mechanically driven pump 226 via the lobe 322 rigidly coupled to a shaft 321. More specifically, energy may be transferred from the lobe 322 to the piston 320. Energy from the lobe 322 may be transferred as a force, translating the piston 320. The lobe 322 and the shaft 321 may rotate in either a clockwise or counterclockwise direction to operate mechanically driven pump 226. For the example shown, in FIGS. 3A-3D, the lobe may rotate in a counter-clockwise direction as indicated by arrow 362. The lobe 322 may be in direct physical contact with the piston 320 and may transfer mechanical energy to the piston 320 as the lobe 322 rotates. The shaft 321 may be the third rotational element 246 of FIG. 2A-2B, or the shaft 321 may be coupled such as to be driven by the third rotational element 246.

The lobe 322 may be an eccentric lobe, where a center of rotation (e.g., the rotational center 338) for the lobe 322 and the shaft 321 is offset from a center 339 of the lobe 322. The rotational center 338 may be approximately the center of the shaft 321. Additionally, the rotational center 338 may be approximately the center of a hole or passage that may receive the shaft 321 therein. For example, a hole 340 may be centered around the rotational center 338 and an axis 410. The eccentric rotation of the lobe 322 may change a position of the piston 320 relative to the pump body 318 as the shaft 321 and the lobe 322 rotate. The lobe 322 may be arranged such that a surface of the lobe 322 contacts the piston 320 while rotating.

The axis 410 may be a central axis for the hole 340, where the hole 340 may be centered radially around. The axis 410 may be a rotational axis for the shaft 321, that the shaft 321 may rotate and spin radially around. The shaft 321 may be centered radially round the axis 410. The axis 410 may intersect the rotational center 338, where the rotational center 338 is an axial point collinear with the axis 410. The shaft 321 may be received by the hole 340, such as to rigidly couple to the lobe 322. The change in distance between a surface of the lobe 322 contacting the piston 320 and the rotational center 338 may change the position of the of the piston 320 relative to the pump body 318, where the piston 320 may be translated in a reciprocal and cyclical manner.

For example, rotating the shaft 321 such that a surface of the lobe 322 in contact with the piston 320 is closer to the rotational center 338 and the axis 410 from a prior surface, may translate the piston 320 in the first direction represented by arrow 312 and closer toward the TDC 313. Likewise, rotating the shaft 321 such that the surface of the lobe 322 in contact with the piston 320 is further from the rotational center 338 and the axis 410 from a prior surface, may translate the piston 320 in the second direction represented by arrow 314 closer toward the BDC 315.

The rotation of the shaft 321 and translation of the piston 320 toward the TDC 313 may be shown in sequence from FIG. 3B to FIG. 3C to FIG. 3D. The shaft 321 may start at a position in FIG. 3B, where the lobe 322 contacts and presses the piston 320 to be at the BDC 315. The shaft 321 then rotates the lobe 322 in a direction of rotation. The piston 320 is translated toward the TDC 313 by the rotation of the lobe 322 and expansion of the spring 324, as shown in FIG. 3C. The shaft 321 may spin about the rotational center 338 and the axis 410 to rotate the lobe 322. The direction of rotation for the lobe 322 may be counter-clockwise, for example. The shaft 321 continues to rotate until the lobe 322 and spring 324 translates the piston 320 to the TDC 313 as shown in FIG. 3D. Further rotation of the shaft 321 from the TDC 313 in the direction of rotation compresses the spring 324 and translates piston 320 toward the BDC 315.

For another example, the rotation of the shaft 321 and translation of the piston 320 toward BDC 315 may be shown in sequence from FIG. 3D to FIG. 3A to FIG. 3B. The shaft 321 may start at a position in FIG. 3D, where the lobe 322 contacts and presses the piston 320 to be at the TDC 313. The shaft 321 rotates the lobe 322 in the direction of rotation. The piston 320 is translated toward the BDC 315 by the rotation of the lobe 322 and compression of the spring 324 as shown in FIG. 3A. The shaft 321 may spin about the rotational center 338 and the axis 410 to rotate the lobe 322. The direction of rotation for the lobe 322 may be counter-clockwise, for example. The shaft 321 continues to rotate until the piston 320 has been translated to the BDC 315 as shown in FIG. 3B. Further rotation of the shaft 321 from the BDC 315 in the direction of rotation allows the expansion of the spring 324 translating the piston 320 toward the TDC 313.

It is to be appreciated that the shaft 321 and lobe 322 may be rotated in a direction opposite to the direction shown in FIGS. 3A-3D to translate the piston 320 toward or away from the TDC 313 and the BDC 315, such as shown in FIGS. 10A-10C. For example, the shaft 321 and lobe 322 may rotate in a clockwise direction instead of counter-clockwise.

Turning briefly to FIGS. 10A-10C, shows a schematic 1000 of the piston 320 and the lobe 322 at a plurality of positions. The schematic 1000 is a cross-section of the piston 320 and the lobe 322. FIG. 10A shows the piston 320 and the lobe 322 at a first position 1010, where the first position 1010 is at a BDC position, where the piston 320 is at the BDC 315. FIG. 10B shows the piston 320 and the lobe 322 at a second position 1020, where the second position 1020 is at a stroke position, where the piston 320 is between the TDC 313 and BDC 315. For this example, the second position 1020 is at an expansion stroke. FIG. 10C shows the piston 320 and the lobe 322 at a third position 1030, where the third position 1030 is at a TDC position, where the piston 320 is at the TDC 313.

Between the first position 1010, the second position 1020, and the third position 1030 of FIGS. 10A-10C, the shaft 321 spins around the rotational center and axis 410 in a second direction indicated by an arrow 1050. The shaft 321 therein rotates the lobe 322 in the second direction indicated by the arrow 1050. The second direction indicated by the arrow 1050 is opposite the first direction indicated by the arrow 362 of FIGS. 3A-3D. The rotation of the shaft 321 in the second direction and translation of the piston 320 from the BDC 315 toward the TDC 313 may be shown in sequence from FIG. 10A to FIG. 10B to FIG. 10C. The shaft 321 may start at the first position 1010 in FIG. 10A, such that the lobe 322 contacts and presses the piston 320 to be at the BDC 315. The shaft 321 then rotates the lobe 322 in the second direction represented by arrow 1050 such that the piston 320 is translated toward the TDC 313 by the rotation of the lobe 322, as shown in the second position 1020 of FIG. 10B. The shaft 321 may spin about the rotational center 338 and the axis 410 to rotate the lobe 322. The rotation of the lobe 322 in the second direction allows a spring contacting and providing a spring load to the piston 320 to expand, translating the piston 320 toward the TDC 313. For example, the spring 324 may contact and provide a load to the piston 320 in FIGS. 10A-10C. The shaft 321 and lobe 322 may continue to rotate from the first position 1010 and the second position 1020, translating the piston 320 toward the TDC 313. The lobe 322 and the spring translate the piston 320 to the TDC 313 as shown in the third position 1030 of FIG. 10C. From the third position 1030, further rotation of the shaft 321 in the second direction may compress the spring 324 and translate piston 320 in the opposite direction toward the BDC 315.

The rotation of the shaft 321 in a direction opposite the second direction represented by arrow 1050 and translation of the piston 320 from the TDC 313 toward the BDC 315 may be shown in sequence from FIG. 10C to FIG. 10B to FIG. 10A. Spinning the shaft 321 and rotating the lobe 322 in a direction opposite to the second direction may compress the spring contacting and providing a load to the piston. The compression of the spring may allow for the translation of the piston between the third position 1030 and the first position 1010. After rotating the lobe 322 and translating the piston 320 to the first position 1010, further rotation of the lobe 322 in a direction opposite to the second direction may allow the spring to expand and the piston 320 to translate toward the TDC 313.

Returning to FIGS. 3A-3D, it should be appreciated that the configuration of the lobe 322 may be non-limiting, and for another example the lobe 322 may be a cam lobe that is non-circular. For this example, the rotational center 338 and the center 339 may occupy the same point, and the lobe 322 may comprise a protrusion extending in a radial direction from the centers 338, 339. The protrusion of the lobe 322 as a cam lobe may change a position of piston 320 relative to pump body 318 as lobe 322 and shaft 321 rotate. Contact between surfaces of protrusion may press and translate the piston 320 away from the TDC 313 and compress the spring 324. At the peak of the protrusion, (e.g., a point on a surface of the protrusion furthest from the rotational center 338), the piston 320 may be translated to the BDC 315. Removal of contact with surfaces of the protrusion to contact with other surfaces of the lobe 322 may raise the piston 320 toward the TDC 313 and extend the spring 324.

Referring briefly to FIG. 9, a schematic 900 that is a cross-section of the piston 320 is shown, where the piston 320 is separated from other components of the mechanically driven pump 226 of FIGS. 3A-3D. The piston 320 may be of a bucket tappet configuration. Said in another way the piston 320 may be a bucket tappet. The piston 320 includes a top 902 and a piston side wall 906. The piston 320 also includes a bottom 904 and a cavity 920. The cavity 920 extends from the bottom 904 to a surface of the interior top wall 329. The top 902 of the piston 320 has a thickness that is indicated at 912 and a skirt length indicated via arrows 376. The piston skirt 328 is the portion of piston side wall

906 that is shown below interior top wall 329. The piston skirt 328 may help to keep piston 320 aligned in the cylindrical cavity or another cavity, such as the hole indicated by arrows 319 shown in FIGS. 3A-3D. When aligned with a cavity via the piston skirt 328, the piston 320 may avoid locking against the cavity or other features of the pump body 318 of FIGS. 3A-3D. The piston skirt 328 may have a length indicated and represented by arrows 376. The length of piston skirt 328 indicated by arrows 376 may be at least 81% and no more than 84% of the diameter of the piston 320. The diameter of the piston 320 may be indicated and represented by arrows 374. In an example, there may be clearance between piston 320 and the hole of the pump body 318 indicated by arrows 319 shown in FIGS. 3A-3D of at least 0.04 millimeters and less than 0.12 millimeters. Additionally, at any position along the pump stroke, the piston skirt 328 may be coupled with the bore (indicated the arrows 319 of FIGS. 3A-3D) of the pump body 318 of FIGS. 3A-3B for not less than a predetermined amount of the pump stroke (e.g., 4/3). The piston 320 in FIG. 9 is shown relative to reference axes 301.

The piston 320 may be centered around a central axis 910. More specifically, the piston 320 may be centered radially around the central axis 910, where the central axis 910 is coaxial with a centerline of the piston 320 and normal to the interior top wall 329. A spring load from the spring 324 of FIGS. 3A-3D, may be applied to an area 942 of the piston 320. A surface of the interior top wall 329 may comprise the area 942 of the piston 320 where the spring load is applied, and the area may be centered around the central axis 910 and/or centerline of the piston 320. The surface comprising the area 942 may be raised at a distance from one or more other surfaces of the interior top wall 329. The area where the spring load is applied may have a threshold distance that is a diameter or width. The threshold distance is represented by arrows 940. For an example, the area 942 may be elliptical in shape, such as approximately circular in shape, and the threshold distance represented by arrows 940 may be a diameter. The threshold distance represented by arrows 940 may be approximately 8 mm, where approximately varies between 1 mm greater or less than the value of the threshold distance. The centrally located spring load from the spring 324 may facilitate the translation of the piston 320 and the rotation of the lobe 322.

Returning to FIGS. 3A-3D, the pump body 318 comprises at least a first opening and a second opening. More specifically, the pump body 318 may comprise one or more inlet openings, such as a pump inlet opening 332. Likewise, the pump body 318 comprises one or more outlet openings, such as a pump outlet opening 334. The pump inlet opening 332, the pump outlet opening 334, and/or other openings of the pump body 318 may be machined into the pump body 318. Liquid and gaseous fluid may flow into and out of the pressure chamber from the pump inlet opening 332 and the outlet opening 334, respectively. Liquid and gaseous fluid, such as lubricant and air, respectively, may flow into and out of the pressure chamber 336. The pump inlet opening 332 and other inlet openings to the pressure chamber 336 may fluidly couple the inlet check valve system 274. Likewise, the pump outlet opening 334 and other outlet openings from the pressure chamber 336 may fluidly couple the outlet check valve system 276. Said in another way, the inlet opening 332 may be in fluid communication with the inlet check valve system 274, and the outlet opening 334 may be in fluid communication with the outlet check valve system 276. The fluid couplings 310 may place the inlet check valve system 274 and the outlet check valve system 276 in fluid communication with the pump inlet opening 332 and pump outlet opening 334, respectively. The fluid couplings 310 may be fluid passages or fluid lines, and the pump body 318 may comprise one or more of the fluid couplings 310. The inlet opening 332 and the outlet opening 334 may be pass-through holes that are drilled having their axis tangential to the hole (e.g., central cavity) of the pump body 318 represented by arrows 319.

The pump inlet opening 332 and the pump outlet opening 334 are outside of the piston stroke of the piston 320 as shown the via arrows 372. The piston 320 may therein be prevented from blocking and sealing the pump inlet opening 332 or pump outlet opening 334, and the skirt 328 may therein be prevented from acting as a guillotine valve.

If acting as a guillotine valve, the skirt 328 may fluidly seal the inlet opening 332, the outlet opening, and other openings that may fluidly communicate with the pressure chamber 336. For example, if the skirt 328 came into surface sharing contact with the surface 326, the skirt 328 may seal inlet openings or outlet openings, such as the inlet opening 332 or outlet opening 334. If such an arrangement occurred, the first part of a stroke may not deliver fluid to the outlet opening as the skirt 328 closes and acts as a guillotine valve. Contrary to a configuration where the skirt 328 is guillotine valve, the inlet opening 332 and outlet opening 334 are un-blocked, allowing for the inlet opening 332 to flow fluid into the pressure chamber 336 during the start of a pressure decrease, and allowing for the outlet opening 334 to receive fluid during the end of a pressure increase in the pressure chamber 336. The positioning of the pump inlet opening 332 and the pump outlet opening 334 outside of the stroke represented by arrows 372 may therein increase the volumetric efficiency of the pump 226 compared to another pump using the guillotine valve solution.

The inlet check valve system 274 comprises at least an inlet port 342 and an inlet check valve 344. The inlet opening 332 is downstream from the inlet port 342. Said in another way, fluid may flow from the inlet port 342 to the inlet opening 332. The inlet check valve 344 may fluidly seal the inlet opening 332 from the inlet port 342. Said in another way, the inlet check valve 344 may create a liquid tight seal preventing liquid fluid flow from the inlet opening 332 to the inlet port 342. Additionally, the inlet check valve 344 may create an airtight seal preventing gaseous fluid flow from the inlet opening 332 to the inlet port 342. Additionally, the inlet check valve 344 may be positioned in the inlet port 342. The inlet check valve 344 is configured such that a decrease in pressure or a differential pressure below a threshold in the pressure chamber 336 may open the inlet check valve 344. Said in another way, the inlet check valve 344 may be opened via suction from pressure chamber 336 and the pump inlet opening 332. The inlet check valve 344 is configured to be normally closed, such that at a normal pressure and other conditions of forces (e.g., when the pump 226 is not operating or in a stroke) the valve is closed via the force of gravity.

The outlet check valve system 276 comprises at least an outlet port 352 and an outlet check valve 354. The outlet port 352 is downstream from the outlet opening 334. Said in another way, fluid may flow from the outlet opening 334 to the outlet port 352. The outlet check valve 354 may fluidly seal the outlet opening 334 from the outlet port 352. Said in another way, the outlet check valve 354 may create a fluid tight seal preventing fluid flow from the outlet port 352 to the outlet opening 334. Additionally, the outlet check valve 354 may create an airtight seal preventing fluid flow from the outlet port 352 to the outlet opening 334. Additionally, the outlet check valve 354 may be positioned in the outlet port 352. The outlet check valve 354 is configured such that an increase in pressure or differential pressure above a threshold in the pressure chamber 336 may open the outlet check valve 354. Said in another way, the outlet check valve 354 may be opened via a blowing force from pressure chamber 336 and the pump outlet opening 334. The outlet check valve 354 is configured to be normally closed, such that at a normal pressure and other conditions of forces (e.g., when the pump 226 is not operating or in a stroke) the valve is closed via the force of gravity.

Turning briefly to FIG. 8, a schematic 800 is shown of a configuration of pump 226, where the inlet check valve 344 and the inlet port 342 are housed by and embedded in the side wall 330 of the pump body 318 of the pump. Likewise, the outlet check valve 354 and the outlet port 352 are housed/embedded in the side wall 330. The inlet port 342 and the outlet port 352 extend through the side wall 330. The inlet port 342 and the outlet port 352 may be pass-through holes and may be drilled. The inlet port 342 and the outlet port 352 may be centered around an axis or a plurality of axes, where the axis or axes extend radially or tangentially to the hole (e.g., central cavity) of the pump body 318 represented by arrows 319.

Embedding the inlet port 342, inlet check valve 344, other components of the inlet check valve system 274, the outlet port 352, the outlet check valve 354, and other components of the outlet check valve system 276 into the pump 226, and more specifically the pump body 318 and side wall 330, may allow the pump 226 to be more compact compared to other configurations pumps that have inlet check valve systems and outlet check valve systems external to a pump body therein. The compactness of the pump 226 may allow for use in smaller packing areas and smaller packing volumes. Additionally, the characteristics of the pump such as volume, fluid flow, and pressure may be tunable by changing the machining parameters for holes and other volumes of the pump body 318 that may house or fluidly couple to the inlet port 342, the inlet check valve 344, other components of the inlet check valve system 274, the outlet port 352, the outlet check valve 354, and other components of the outlet check valve system 276.

Returning to FIGS. 3A-3B the piston 320 is shown moving in a downward direction (e.g., the second direction) of arrow 314 toward the BDC 315. The movement of the piston 320 toward the BDC 315 may be represented by arrow 380. Rotation of the lobe 322 may press the piston 320 downward in the direction of arrow 380, and the piston 320 may therein compress the spring 324. As the piston 320 moves in the direction of arrow 380 and the spring 324 may compress, pressure to chamber 336 may increase above one or more thresholds, such that the force of gravity may close the inlet check valve 344 and a blowing force from the pressure may open the outlet check valve 354. The opening of the outlet check valve 354 allows the fluid to exit the pump through a discharge port (e.g., the outlet port 352). The positive pressure differential in the chamber 336 relative to the enclosed environment 303 may drive fluid out through pressure chamber 336, through the pump outlet opening 334, and out of the outlet port 352. The movement of gas and/or liquid fluid out of the pressure chamber through the pump outlet opening 334 and out of the outlet port 352 may be represented by arrows 382.

In FIGS. 3C-3D the piston 320 is shown moving in an upward direction (e.g., the first direction) of arrow 312 toward the TDC 313. The movement of the piston 320 toward the TDC 313 may be represented by arrow 390. As the lobe rotates, the spring 324 may extend and the spring force of the spring 324 may press the piston 320 upward in the direction of arrow 390. Pressure to the pressure chamber 336 may decrease below one or more thresholds that may open the inlet check valve 344 via a sucking force and allow the force of gravity to close the outlet check valve 354. The opening of the inlet check valve 344 allows the fluid to enter the pump through a charge port (e.g., the inlet port 342). The negative pressure differential in the chamber 336 relative to the enclosed environment 303 may drive fluid toward pressure chamber 336, through the inlet port 342 and the inlet opening 332 via suction. The movement of gas and/or liquid fluid into the pressure chamber through the inlet port 342 and out of the inlet opening 332 may be represented by arrows 392.

Referring now to FIGS. 3A-3D, an operating sequence is shown where the mechanically driven pump 226 reciprocates between different positions. In the sequence of FIGS. 3A-3D, piston 320 moves radially with respect to the rotational center 338 and the lobe 322 rotating clockwise as indicated by arrow 362. The sequence begins at FIG. 3D, and then proceeds in order from FIG. 3A, to FIG. 3B, to FIG. 3C.

FIG. 3D shows piston 320 in its fully extended position relative to the pump body 318. One end of the spring 324 is in direct contact with the pump body 318 and the other end of spring 324 is in direct contact with the interior top wall 329 of piston 320. The spring 324 presses directly against piston 320 in order to force the piston 320 against the lobe 322. The spring 324 pushes the piston 320 away from the pump body 318 as shown by arrow 390 to generate suction to draw lubricant into the pressure chamber under the piston 320 as shown by arrows 392. However, at the TDC 313 the piston 320 may stop moving in the direction indicated by arrow 312, and is preventing increase in volume, and the suction to the pressure chamber 336 may stop. At the TDC 313 the piston 320 and the pressure chamber under the piston 320 may experience a ram pressure from movement of fluid increasing the pressure. Additionally or alternatively, preventing the pressure chamber 336 to increase in volume may cause the pressure therein to equalize with or increase to be nearer in value to another pressure at the inlet port 342. At the TDC 313, 320 the volume of the pressure chamber 336 is no longer increasing and/or the ram pressure of fluid may increase the pressure of the pressure chamber 336 above a first threshold of pressure. Above the first threshold of pressure, the suction force from the pressure chamber 336 may be reduced to less than the force of gravity, closing the inlet check valve 344. Closure of the inlet check valve 344 may prevent further inflow of fluid into the pressure chamber 336. As piston 320 stops translating at the TDC 313 some fluid of the pressure chamber 336 may flow to a volume or a plurality of volumes between the inlet opening 332 and the inlet check valve 344 as represented via arrow 398.

FIG. 3A shows the piston 320 moving away from TDC 313 and toward BDC 315 as indicated by arrow 380. The spring 324 may begin to compress due to the movement and force of the piston 320. As the spring 324 compresses the volume of the pressure chamber 336 decreases. Moving the piston 320 toward the pump body 318, and more specifically the surface 326, as indicated by arrow 380, causes a greater pressure to develop in pressure chamber 336. When the piston 320 is at the position shown in FIG. 3A, the pressure of the pressure chamber 336 has increased to or above the first threshold of pressure, such that the force of suction to the inlet check valve 344 becomes less than force of gravity, causing the inlet check valve 344 to close via the force of gravity. Further, when the piston 320 is at the position shown in FIG. 3A, the pressure of the pressure chamber 336 has increased to or above a second threshold, such that a blowing force is applied to the outlet check valve 354. Further, when the piston 320 is at the position shown in FIG. 3A, the pressure of the pressure chamber 336 has increased to or above a third threshold, such that a blowing force is greater than the force of gravity acting on the outlet check valve 354. The outlet check valve 354 may therein be opened, allowing for the positive differential pressure of the pressure chamber 336 and the movement of the piston 320 to push fluid flow out of the pressure chamber 336 through the outlet opening 334, the outlet check valve 354, and the outlet port 352 as shown by the arrows 382.

FIG. 3B shows piston 320 at the BDC position, where the piston 320 is at the BDC 315. Flow through outlet port 352 may be reduced to near zero. While for an example, fluid is shown flowing out of the outlet port 352 via arrows 382. The pressure of the pressure chamber 336 may equalize with or decrease becoming closer to another pressure at the outlet port 352 when the piston 320 is at the BDC 315. The pressure of the pressure chamber 336 may therein decrease below the third threshold of pressure. Below the third threshold the blowing force to the outlet port 352 may be reduced to less than the force of gravity, closing the outlet check valve 354. Closure of the outlet check valve 354 may prevent further backflow of fluid into the pressure chamber 336, such as from the outlet port 352. As the piston 320 stops translating at the BDC 315, some residual fluid may flow back into the pressure chamber 336 from volumes between outlet opening 334 and the outlet check valve 354 as represented by arrow 388.

As the lobe 322 continues to rotate, the piston 320 may be translated via the spring 324 and surface contact with the lobe 322 in the first direction indicated by arrow 312. FIG. 3C shows the piston 320 between the BDC position and the TDC position, where the piston 320 is between the BDC 315 and the TDC 313. Moving piston 320 away from the pump body 318, and more specifically the surface 326, as indicated by arrow 390, causes a lower pressure to develop in pressure chamber 336. When the piston 320 is at the position shown in FIG. 3C, the pressure of the pressure chamber 336 has decreased below the third threshold of pressure, such that the blowing force to the outlet check valve 354 becomes less than gravity, causing the outlet check valve 354 to close via the force of gravity. Further, when the piston 320 is at the position shown in FIG. 3C, the pressure of the pressure chamber 336 has decreased below a second threshold, such that a suction force is applied to the inlet check valve 344. Further, when the piston 320 is at the position shown in FIG. 3C, the pressure of the pressure chamber 336 has decreased below a first threshold, such that the suction force is greater than the force of gravity acting on the inlet check valve 344. The inlet check valve 344 may therein be opened, allowing for the negative differential pressure of the pressure chamber 336 and the movement of the piston 320 to suck fluid flow into the pressure chamber 336 through the outlet opening 334, the outlet check valve 354, and the outlet port 352 as shown by arrows 392.

The piston 320 may continue to rise from the position shown in FIG. 3C to the TDC position shown in FIG. 3D.

FIG. 4 shows a view 400 of mechanically driven pump 226. The mechanically driven pump 226 of FIG. 4 is shown approximately to scale with approximate positioning. The pump 226 has a height parallel with the first axis 404, where the height of the pump body 318 may be represented via arrows 462. The first axis 404 may be one of a plurality of other axes the height of the pump body 318 may be parallel with. Additionally, the height of the pump body 318 may be parallel with a second axis 406 and a third axis 408. Said in another way the first axis 404, the second axis 406, and the third axis 408 may be parallel. The first axis 404, the second axis 406, and the third axis 408 may be arranged vertically with respect to the z-axis of the reference axes 301.

Additionally, the components of the inlet check valve 344 and the outlet check valve 354 are shown exploded via the view 400. Components of the inlet check valve 344 are extended out from the pump body 318 along and centered around the second axis 406. Likewise, components of the outlet check valve 354 are extended out from the pump body 318 along and centered around the third axis 408. The components of the inlet check valve 344 may be enclosed by a plurality of first dotted lines 412 arranged in a rectangle for clarity. Likewise, the components of the outlet check valve 354 may be enclosed by a plurality of second dotted lines 414 arranged in a rectangle for clarity. The inlet check valve 344 and the outlet check valve 354 may be ball check valves. The inlet check valve 344 and the outlet check valve 354 are springless check valves, wherein the inlet check valve 344 and the outlet check valve 354 lack springs, such as preload springs. The inlet check valve 344 and the outlet check valve 354 are oriented vertically, such as to be centered radially around vertical axes. When centered around vertical axes, the force of gravity may close the inlet and outlet check valves 344, 354. A force acting opposite to the force of gravity, such as a force from hydraulic pressure, may open the inlet check valve 344 or the outlet check valve 354.

The lobe 322 is centered around an axis 411. The axis 411 may be parallel with the axis 410. The hole 340 is centered radially around the axis 410. The hole 340 may include groove 430. A shaft or another rotational element, such as shaft 221 of FIGS. 3A-3D and FIG. 8, may rigidly couple to the lobe 322 via the groove. For example, the shaft 221 may have an appendage or an extension extending radially outward therein that fits and couples to the groove 430 via a tongue and groove arrangement.

The pump body 318 may comprise a first hole 422, a second hole 424, and a third hole 426. The first hole 422 may be centered about and/or curve radially around the first axis 404, and the first hole 422 may be the hole represented by arrows 319 of FIGS. 3A-3D and FIG. 8. Likewise, the second hole 424 may be centered about and/or curve radially around the second axis 406, and the third hole 426 may be centered radially about and/or curve radially around the third axis 408. The first hole 422, the second hole 424, and the third hole 426 may be cylindrical in shape and volume. The second hole 424 and the third hole 426 may each be part of a check valve system such as the inlet check valve system 274 and outlet check valve system 276 of FIGS. 2A-3D, respectively. Likewise, the second hole 424 and the third hole 426 may be part of or at least fluidly coupled to the inlet port 342 of FIGS. 3A-3D and the outlet port 352, respectively. Further, the second hole 424 may be placed in fluid communication with the first hole 422 via the inlet check valve 344 and one or more openings to the first hole 422. Likewise, the third hole 426 may be placed in fluid communication with the first hole 422 via the outlet check valve 354 and one or more openings to the first hole 422. For example, the second hole 424 may be selectively placed in fluid communication with the first hole 422 via the pump inlet opening 332 of FIGS. 3A-3B and FIG. 8, such as when the inlet check valve 344 is opened. Likewise, the third hole 426 may be selectively placed in fluid communication with the first hole 422 via the outlet opening 334 of FIGS. 3A-3B and FIG. 8, such as when the outlet check valve 354 is opened.

The first hole 422 may house the piston 320 and the spring 324. Additionally, the first hole 422 may house a adaption plate 432. The adaption plate 432 may be sandwiched between the piston 320 and the spring 324 along the first axis 404. The adaption plate 432 may contact the piston 320 and the spring 324. The adaption plate 432 may be vertically between the piston 320 and the spring 324. The second hole 424 may house the inlet check valve 344, and the third hole 426 may house the outlet check valve 354.

The adaption plate 432 may keep the spring 324 centered within the piston 320. Said in another way, the adaption plate 432 may reduce the spring 324 from becoming un-center from first axis 404 and/or the centerline of the piston 320. Additionally, the adaption plate 432 may apply a spring load from the spring 324 to the center of the piston 320. The spring load may be applied to an area of the piston 320, such as an elliptical area, via the adaption plate 432. For example, the area for contact load to be applied may be an ellipse located on an area of the interior top wall 329 of FIGS. 3A-3D having the threshold distance represented by arrows 940 of FIG. 9. The adaption plate 432 may contact and abut the area with the threshold distance represented by arrows 940. The area may be the area 942 of the interior top wall 329 of FIG. 9. The centrally located spring load from the spring 324 and the adaption plate 432 may facilitate the translation of the piston 320 and the rotation of the lobe 322.

The inlet check valve 344 may include a first ball 442, a first plug 444, and a first retainer ring 446. The first ball 442, the first plug 444, and the first retainer ring 446 may be centered radially around the second axis 406. The first ball 442 is an internal ball of the inlet check valve 344, and the first ball 442 may be an approximately spherical rolling element ball bearing. For example, the first ball 442 may be a $^{17}\!/_{32}$" rolling element of a ball bearing. The first plug 444 may be partially cylindrical and partially frustoconical in shape. A first portion of the first plug 444 that is partially frustoconical in shape may have surface contact with the first ball 442. Likewise, a second portion the of the first plug 444 that is cylindrically in shape may be positioned above the first portion. The first retainer ring 446 may be a configuration of retainer ring with inward or internal facing ears, such as an internal style retainer ring, that a groove may be positioned radially around. The first retainer ring 446 may be a snap ring. The first plug 444 may comprise a first groove 448, where the first groove 448 is positioned axially, with respect to the second axis 406, between the first portion and the second portion of the first plug 444. The first groove 448 may extend radially inward toward the center of the first plug 444, such as radially inward toward the second axis 406. The first retainer ring 446 may be fit to the first groove 448 such as to physically couple. The first retainer ring 446 may physically couple the first plug 444 to the second hole 424, such as via a tongue and groove arrangement where the first retainer ring 446 is a tongue that physically couples and is fit to another groove of the pump body 318. The another groove may extend radially outward into inner surfaces and side walls of the pump body 318 curving around the second hole 424.

It is to be appreciated that the configuration of the pump 226 and the inlet check valve 344 shown in FIG. 4 may be non-limiting and may include less parts. For example, the inlet check valve 344 may include other parts or less parts, including a minimum quantity of components to comprise a check valve. For these examples, the inlet check valve 344 may include another fastener than the first retainer ring 446. For example, the inlet check valve 344 may include another fastener than the first retainer ring 446 to fasten the first plug 444, such as another retainer ring, where the another retainer ring may be of a simpler configuration. Further, for another example, the check valve may lack a fastener separate from other components of the inlet check valve 344. A feature or component of the inlet check valve 344, such as another configuration of the first plug 444, may physically couple or comprise a fastening feature that may fasten to the pump body 318 via the second hole 424. For this or another example, the pump body 318 may comprise or physically couple to one or more other fastening features that may extend radially inward or another direction inward toward the second hole 424. The other fastening features may fasten to and fluidly seal with a feature of the inlet check valve 344. The one or more other fastening features may fasten to a feature or component of the inlet check valve 344 via a groove, such as the first plug 444 via the first groove 448, respectively.

When physically coupled to the pump body 318 via the first retainer ring 446, the first retainer ring 446 may prevent translation or other movement of the first plug 444 without a deliberate force above a threshold. A deliberate force above the threshold may remove the first plug 444 and the first retainer ring 446 from the second hole 424. The first plug 444 may fluidly seal with against the side walls and surfaces of the pump body 318 surrounding the second hole 424, such that the fluid seal may be at least liquid tight, preventing leakage of liquid from the second hole 424. Likewise, the seal created by the first plug 444 between the side walls and surfaces of the pump body 318 surrounding the second hole 424 may be air tight, such that leakage of air or other gasses from the second hole 424 may be prevented.

The outlet check valve 354 may include a second ball 452, a second plug 454, a third plug 456, and a second retainer ring 458. The second ball 452, the second plug 454, the third plug 456, and the second retainer ring 458 may be centered radially around the third axis 408. The second ball 452 is an internal ball of the outlet check valve 354, and second ball 452 may be an approximately spherical rolling element ball bearing. For example, the second ball 452 may be a $^{17}\!/_{32}$" rolling element of a ball bearing. The second plug 454 may be partially frustoconical in shape. The third plug 456 may be partially cylindrical in shape. A second plug 454 may have surface contact with the second ball 452. The third plug 456 may be positioned above and have surface contact with the second plug 454. The second retainer ring 458 may be a configuration of retainer ring with inward or internal facing cars, such as an internal style retainer ring, that a groove may be positioned radially around. The second retainer ring 458 may be a snap ring. The third plug 456 may comprise a second groove 460. The second groove 460 may extend radially inward toward the center of the third plug 456, such as radially inward toward the third axis 408. The second retainer ring 458 may be fit to the second groove 460 such as to physically couple. The second retainer ring 458 may physically couple the third plug 456 to the third hole 426, such as via a tongue and groove arrangement, where the second retainer ring 458 is a tongue that physically couples and is fit to another groove of the pump body 318. The another groove may extend radially outward into inner surfaces and side walls of the pump body 318 that curve around the third hole 426.

When physically coupled via the second retainer ring 458, the second retainer ring 458 may prevent translation or other movement of the third plug 456 without a deliberate force above a threshold. Deliberate forces above the threshold may remove the second retainer ring 458 and the third plug 456 from the third hole 426. The second plug 454 and the third plug 456 may fluidly seal against the side walls and surfaces of the pump body 318 surrounding the third hole 426, such that plurality of fluid seals may be at least liquid tight, preventing leakage of liquid from the third hole 426. Likewise, the seals created via the second plug 454 and the third plug 456 against the side walls and surfaces of the pump body 318 surrounding the third hole 426 may be air tight, such that leakage of air or other gasses from the third hole 426 may be prevented.

There may be a first gap between the first ball 442 and the first plug 444 represented by a plurality of arrows 472. The first ball 442 may be moved upward by a negative differential pressure that increases the pressure of a first space between the first ball 442 and the first hole 422. More specifically, the first ball 442 may be moved upward by a negative differential pressure less than a first threshold of pressure, producing a suction force greater than the force of gravity. The suction force greater than gravity may translate the first ball 442 upward, allowing fluid to flow from the second hole 424 to the first hole 422. The first gap may decrease in size until the first ball 442 contacts the first plug 444.

There may be a second gap between the second plug 454 and the third plug 456 represented by a plurality of arrows 474. The second ball 452 may be moved upward by a positive differential pressure that increases the pressure of a second space between the second ball 452 and the first hole 422 greater than a second threshold of pressure, placing a blowing force on the second ball 452 greater than the force of gravity. The second ball 452 and the second plug 454 may be translated upward, allowing fluid to flow from the first hole 422 to the third hole 426. The second gap may decrease in size until the second plug 454 contacts and seals with the third plug 456.

It is to be appreciated that the configuration of the pump 226 and the outlet check valve 354 shown in FIG. 4 may be non-limiting and may include less parts. For example, the outlet check valve 354 may include other or less parts, including a minimum quantity of components such as to be a check valve. For these examples, the outlet check valve 354 may include another fastener than the second retainer ring 458. For example, the outlet check valve 354 fasten the second plug 454 to the pump body 318, such as another retainer ring, where the another retainer ring may be of a simpler configuration. Further, for another example, the outlet check valve 354 may lack a fastener separate from other components of the outlet check valve 354. A feature or component of the outlet check valve 354, such as other configurations of the third plug 456, may physically couple or comprise a fastening feature. The fastening feature may fasten the feature or component of the outlet check valve 354 to the pump body 318 via the third hole 426. For this or another example, the pump body 318 may comprise or physically couple to one or more other fastening features that may extend radially inward or another direction inward toward the third hole 426. The other fastening features may fasten to and fluidly seal with a feature of the outlet check valve 354. The one or more of the other fastening features may fasten to a groove of a feature or component of the outlet check valve 354, such as a groove of the second plug 454 or the third plug 456. Additionally, for these or another example, the outlet check valve 354 may include a single plug instead of two, such as only the third plug 456.

The minimum differential pressure to move either the first ball 442 or the second ball 452, whether a negative differential pressure for the suction force or a positive differential pressure for a blowing force, may be determined via an equation. More specifically, the force may be determined weight of the ball divided by the cross-sectional area of a hose or another fluid passage, along with addition of the pump hydrostatic head. The hose or hoses may be internal to the pump body 318. The minimum differential pressure may be represented via equation 3.

$$\Delta P = W_b/(A_h) + HH = (\mathrm{m} * \mathrm{g})/(A_h) + HH. \qquad 3$$

$\Delta P$ is the minimum differential pressure to translate the ball and open a check valve. $W_b$ is the weight of an internal ball of a check valve, such as the first ball 442 or the second ball 452. HH is the hydrostatic head. When determining $\Delta P$ for the ball of the inlet check valve 344, HH may be total dynamic suction head (TDSH) from the suction side of the pump 226, such as from the inlet port 342. When determining $\Delta P$ for the ball of the outlet check valve 354 and the hydrostatic head may be the static discharge head (SDH) from the exhaust side of the pump 226, such as from the outlet port 352. An is the cross-sectional area of a hose. For the ball of the inlet check valve 344, $A_h$ may be a cross-sectional area of a hose or another fluid passage that fluidly couples the inlet check valve 344 to the pump inlet opening 332. For the ball of the outlet check valve 354, An may be a cross-sectional area of a hose or another fluid passage that fluidly couples to the pump outlet opening 334 to the outlet check valve 354. m may be the mass of the ball. g may be the acceleration due to gravity.

Thus, the pump of FIGS. 1-4 and FIGS. 8-9 provides for a pump, comprising: a spring; a piston configured to receive the spring; a pump body including a cylindrical cavity configured to receive the spring; and a first check valve and a second check valve that are springless and closed via the force of gravity. The first check valve is an inlet check valve configured to fluidly couple to an inlet port, open due to suction and decrease in pressure during an expansion stroke of the piston, and suck fluid into the cylindrical cavity. The second check valve is an outlet check valve configured to fluidly couple to an inlet port, open due to a blowing force and increase in pressure during a compression stroke of the piston, and push fluid out of the cylindrical cavity.

The disclosure also provides support for a pump for lubrication, comprising: a lobe mounted on and driven by a shaft, a piston in contact with the lobe, a spring acting on the piston, an inlet check valve positioned in an inlet port, and an outlet check valve positioned in an outlet port, where the inlet check valve and the outlet check valve do not comprise preload springs and are positioned vertically in a normally closed position due to a force of gravity acting on internal balls of the inlet check valve and outlet check valve. In a first example of the system further comprising a pump body of the pump, a cylindrical hole of the pump body of the pump is configured to receive the piston. In a second example of the system, optionally including the first example further comprising a pump body of the pump, the inlet check valve is positioned in and fluidly seals a first hole of the pump body, the outlet check valve is positioned in and fluidly seals a second hole of the pump body, and the first hole and the second hole are arranged vertically with openings open to a surface normal to a vertical axis of the pump. In a third example of the system, optionally including one or both of the first and second examples, the inlet port fluidly couples a first opening and the outlet port fluidly couples a second opening in fluid communication with a pressure chamber housing the spring and acted on by the piston, and the first opening and the second opening are outside of a piston stroke of the piston, such that the piston is prevented from blocking the first opening or the second opening. In a fourth example of the system, optionally including one or more or each of the first through third examples, the inlet port comprises the first opening and the outlet port comprises the second opening. In a fifth example of the system, optionally including one or more or each of the first through fourth examples, the inlet port is located in a side wall of a pump body, and the first opening extends through the side wall of the pump body. In a sixth example of the system, optionally including one or more or each of the first through fifth examples, the outlet port is located in a side wall of a pump body, and the second opening extends through the side wall of the pump body. In a seventh example of the system, optionally including one or more or each of the first through sixth examples, the pump is a scavenger pump with a suction side fluidly coupled to a dry sump. In an eighth example of the system, optionally including one or more or each of the first through seventh examples, the piston includes a skirt. In a ninth example of the system, optionally including one or more or each of the first through eighth examples, the skirt has a length that is less than a diameter of the piston, where the length is at least than 81% the diameter and no more than 84% the diameter. In a tenth example of the system, optionally including one or more or each of the first through ninth examples, the lobe is a cam lobe. In an eleventh example of the system, optionally including one or more or each of the first through tenth examples, the lobe is an eccentric lobe. In a twelfth example of the system, optionally including one or more or each of the first through eleventh examples, the shaft is driven by a mechanical system lubricated via the pump.

The disclosure also provides support for a transmission of a vehicle, comprising: a self-priming pump, including: an eccentric lobe, a spring, a piston configured to receive the spring and interact with the eccentric lobe, a pump body including a cylindrical hole configured to receive the spring, an inlet check valve positioned in an inlet port, and an outlet check valve positioned in an outlet port, where the inlet check valve and the outlet check valve do not comprise preload springs and are positioned vertically in a normally closed position due to a force of gravity acting on internal balls of the inlet check valve and the outlet check valve. In a first example of the system, the eccentric lobe is rigidly coupled to a rotational element of a mechanical system, the mechanical system drives the eccentric lobe via the rotational element, and the mechanical system receives targeted lubrication by a lubrication system including the self-priming pump.

Referring now to FIG. 5, a method 500 for operating a mechanically driven pump is shown. The method of FIG. 5 may be performed via a mechanically driven pump such as the mechanically driven pump 226 as shown in FIGS. 2-4, and FIGS. 8-9. Further the pump driven via method 500 may be a scavenger pump with a suction side intake gaseous and liquid fluid from a dry sump. A lobe of the mechanically driven pump may be an eccentric (e.g., eccentric lobe), such as the lobe 322 shown in FIGS. 3A-4 and FIG. 8. However, it is to be appreciated that the lobe may be a cam (e.g., a cam lobe). The method 500 reciprocates the mechanically driven pump between an expansion and a compression stroke.

At 502, method 500 rotates a shaft and a lobe to provide motive force to a pump that is shown in FIGS. 2A-4, and FIGS. 8-9. The shaft may be rotated via a take-off from a rotating shaft in a transmission, gearbox, or other device. More specifically, the shaft may be driven via a mechanical input from one or more mechanical systems, such as a gearset, of the transmission, gearbox, or other device. The shaft may be coupled to such as to be driven by takeoff, where the takeoff is configured to be driven by a mechanical system, such as a mechanical system 216 of FIGS. 2A-2B. Method 500 proceeds to 504. The mechanical system that drives the mechanically driven pump may have one or more components lubricated via a lubrication system the pump is a part of.

At 504, method 500 performs an expansion stroke for the mechanically driven pump. During the intake stroke, the lift (e.g., the distance from a contacting surface and the rotational axis) of the lobe decreases and a spring applies force to move a piston away from a body (e.g., a pump body) of the mechanically driven pump. The lobe may be an eccentric, such as the lobe 322 of FIGS. 3A-4 and FIG. 8. The piston may be the piston 320 of FIGS. 3A-4 and FIGS. 8-9. The spring may be the spring 324 of FIGS. 3A-4 and FIG. 8. Moving the piston away from the body of the mechanically driven pump may expand an area between the piston and the body of the mechanically driven pump, thereby reducing pressure within the area that is between the piston and the body of the mechanically driven pump. The area may be a pressure chamber, such as the pressure chamber of 336 of FIGS. 3A-3D and FIG. 8. Moving the piston away from the body of the mechanically driven pump also causes the inlets of the mechanically driven pump to open and the outlets of the mechanically driven pump to close. Below a threshold of pressure, the one or more inlets may be opened via at least a first check valve, such as the inlet check valve 344 of FIGS. 3A-4 and FIG. 8, opening. The first check valve is in fluid communication with the inlets and the area between the piston and the body, and when open, allows for fluid communication between the inlet and the area therein. Likewise, below the threshold of pressure, the one or more outlets may be closed via at least a second check valve, such as the outlet check valve 354 of FIGS. 3A-4 and FIG. 8, closing. The second check valve may be in fluid communication with the outlets and the area between the piston and the body, and when closed, prevents fluid communication between the outlet and the area therein. The inlets opened via the check valve may include at least an inlet port, such as the inlet port 342 of FIGS. 3A-3D and FIG. 8. The outlets closed via the check valve may include at least an outlet port, such as the outlet port 352 of FIGS. 3A-4 and FIG. 8. The combination of opened inlet ports and low pressure under the piston drives allows for fluid flow into the mechanically driven pump. During the expansion stroke the piston may be translated and the area may continue to expand until the piston is translated to a TDC. Upon reaching the TDC, the expansion stroke and 504 ends, and method 500 proceeds to 506. The steps of 504 may be described for and illustrated in greater detail by a method of FIG. 6.

At 506, method 500 performs a compression stroke for the mechanically driven pump. During the compression stroke, the lift of the lobe increases so that the lobe translates the piston toward BDC and as a consequence the spring is compressed. Thus, the piston moves toward the body of the mechanically driven pump. Moving the piston toward the body of the mechanically driven pump may reduce the area between the piston and the body of the mechanically driven pump, thereby increasing pressure within the area that is between the piston and the body of the mechanically driven pump. Moving the piston toward the body of the mechanically driven pump also causes the inlets of the mechanically driven pump to close and the outlets of the mechanically driven pump to open. Above another threshold of pressure, the one or more inlets may be closed via at least the first check valve closing, preventing fluid communication between the inlet and the area between the piston and the body therein. Likewise, above the other threshold of pressure, the one or more outlets may be opened via at least the second check valve opening, placing outlets in fluid communication with the area between the piston and the body therein. The combination of closed inlet ports and higher pressure under the piston drives flow out of the mechanically driven pump. Upon reaching the BDC, the compression stroke and 506 ends, and method 500 proceeds to 508. The steps of 506 may be described for and illustrated in greater detail by a method of FIG. 7.

At 508, the method 500 may loop or end depending on if the pump, and more specifically, the piston is still receiving rotational energy from the rotational element, such as to be actuated. Said in another way, at 508 the next steps of method 500 are determined by whether the lobe remains in contact with the piston and rotating. If the piston continues to receive rotational energy from the lobe (e.g., 508 is YES), method 500 may return to 504 to begin another cycle of the pumping operation sequence for the mechanically driven pump. If transfer of rotational energy from the lobe to the piston stops (e.g., 508 is NO), method 500 proceeds to exit or end.

Turning to FIG. 6, it shows a method 600 for moving a piston of a pump of the present disclosure during an expansion stroke. During the expansion stroke an outlet check valve (e.g., the second valve described in method 500 of FIG. 5) is closed and an inlet check valve (e.g., the first valve described in method 500 of FIG. 5) is opened. Said in another way, method 600 operates actuating components of a mechanically driven pump of the present disclosure specifically during an expansion stroke. The method 600 may be performed via a mechanically driven pump, such the mechanically driven pump 226 as shown in FIGS. 2-4 and FIG. 8.

Method 600 begins at 602 by rotating the lobe describe in method 500 from a starting position toward a TDC position. The starting position and TDC positions are radial positions with respect to the lobe and rotational axis of the lobe. At the TDC position, a surface of the lobe contacts the piston such that the piston has been translated to the TDC. The lobe may be driven via a rotational element such as a shaft. The lobe may rotate in a first direction or a second direction, where the first direction and the second direction are opposite to one another. As the lobe begins to rotate toward the TDC position, a distance between surfaces of the lobe contacting the piston and the rotational axis of the lobe decreases. Said in another way, the distance between the surface contacting the piston and central axis and center of the rotational element driving the lobe, decreases. The spring, and more specifically the load of the spring, causes a decrease of the downward force from the lobe to the piston, as the spring acts opposite to a force from contact between the piston and the lobe. The spring pushes the piston towards the TDC via the spring load.

Upon decreasing downward force below a threshold, method 600 continues to 604, where the spring begins to expand as downward force becomes less than the spring force. The expansion of the spring translates the piston toward and presses the piston against the lobe. The expansion of the spring keeps the piston in contact with the lobe. Likewise, the expansion of the spring increases the volume of an area between the piston and the body of the pump, such as the pressure chamber 336 of FIGS. 3A-3D and FIG. 8. Increasing the volume may decrease the pressure of the area between the piston and the body of the pump. The area between the body and the piston may be referred to herein as a pressure chamber.

Method 600 continues to 606, where the pressure of the pressure chamber decreases below a first threshold of pressure. Below the first threshold of pressure, a blowing force placed on the outlet check valve, and more specifically the internal ball, becomes less than the force of gravity placed on the outlet check valve. The outlet check valve may therein be closed via the force of gravity.

Method 600 continues to 608, where the pressure of the pressure chamber decreases below a second threshold of pressure to have a negative differential pressure relative to an outside environment of the body, such as the enclosed environment 303 of FIGS. 3A-3D. More specifically, below the first threshold, the pressure chamber may have a negative differential pressure relative to the inlets and outlets to the pump, such as the inlet and outlet ports 342, 352, that may be placed in selective fluid communication with pressure chamber via the first check valve and the second check valve. Reaching negative pressure, creates suction between the inlet check valve and pressure chamber. The inlet check valve is configured such that a suction force greater than the force of gravity may open the inlet check valve. Additionally, the negative pressure creates suction between the outlet check valve and pressure chamber. The outlet check valve is configured, such that the force of suction is additive to the force of gravity, further helping to seal and close the outlet check valve during the expansion stroke.

At 610, the method 600 decreases the pressure of the pressure chamber to at or below a third threshold of pressure. At or below the third threshold of pressure, the force of suction placed on the inlet valve is increased to be greater than the force of gravity on the internal ball of the inlet check valve. The internal ball is raised by the force of suction, opening the inlet valve. The inlet valve opening allows fluid to flow into the pressure chamber of the pump. The fluid may comprise both gas and/or liquid, where the gas may be or include air and the liquid may be or include lubricant. Fluid flows as long as the differential pressure of the chamber is negative, and the differential pressure may remain negative as the volume of the pressure chamber expands and the piston translates toward the TDC.

At 612, the method 600 rotates the lobe to the TDC position, raising the piston to the TDC. At the TDC the piston stops upward movement and translation away from the body of the pump. Upon stopping upward movement of the piston, the pressure of the pressure chamber stops decreasing. Additionally, the differential pressure of the pressure chamber may equalize, such that the pressure of the pressure chamber and the pressure outside the pressure chamber, such as the pressure of the inlet and outlet ports, are equal. As pressure equalizes, fluid stops moving into the chamber and through the inlet check valve. It is to be appreciated that as pressure equalizes the force of suction to the inlet check valve may cease, and the inlet check valve may therein close via the force of gravity at 612.

After 612, method 600 ends.

Turing to FIG. 7, it shows a method 700 for moving a piston of a pump of the present disclosure during a compression stroke. During the compression stroke an outlet check valve (e.g., the second valve described in method 500 of FIG. 5) is opened and an inlet check valve (e.g., the first valve described in method 500 of FIG. 5) is closed. Said in another way, method 700 operates actuating components of a mechanically driven pump of the present disclosure specifically during compression stroke. The method 700 may be performed via a mechanically driven scavenger pump, such the mechanically driven pump 226 as shown in FIGS. 2-4 and FIG. 8.

Method 700 begins at 702 by rotating the lobe described in method 500 from a starting position toward a BDC position. The starting position and BDC positions are radial positions with respect to the lobe and rotational axis of the lobe. At the BDC position, a surface of the lobe contacts the piston such that the piston has been translated to the BDC. The lobe may be driven via a rotational element such as a shaft. The lobe may rotate in a first direction or a second direction, where the first direction and the second direction are opposite to one another. As the lobe begins to rotate toward the BDC position, a distance between surfaces of the lobe contacting the piston and the rotational axis of the lobe increases. Said in another way, the distance between the surface contacting the piston and central axis and center of the rotational element driving the lobe increases. The surface contacting the piston becomes further in distance from the rotational axis presses against and increases force placed on the piston. More specifically the lobe being lowered relative to the rotational axis, pushing pushes opposite to the load of the spring. The force of contact between the lobe and the piston in a direction opposite to the load of the spring may be greater than the spring force, pressing and compressing the spring. The increase in force from contact between the lobe and the piston, may be in a downward direction against piston.

Upon increasing downward force above a threshold, method 700 continues to 704, where the spring begins to compress as downward force becomes greater than the spring force. The compression of the spring translates the piston in a direction toward the BDC. The rotation and increase in distance between the surface in contact with piston and the rotational axis of the lobe, keeps the piston in contact with the lobe. Likewise, the compression of the spring decreases the volume of an area between the piston and the body of the pump, such as the pressure chamber 336 of FIGS. 3A-3D and FIG. 8. Decreasing the volume may increase the pressure of the area between the piston and the body of the pump. The area between the piston and the body of the pump may be referred to as pressure chamber herein. Said in another way, compression of the spring decreases the volume and increase the pressure of the pressure chamber between the piston and the body.

Method 700 continues to 706, where the pressure of the area between the piston and the body of the pump increases above a first threshold of pressure. At or above the first threshold of pressure, the force of suction placed on the inlet check valve, and more specifically the internal ball, becomes less than the force of gravity placed on the inlet check valve. The inlet check valve may therein be closed via the force of gravity.

Method 700 continues to 708, where the pressure of the area between the piston and the body of the pump increases above a second threshold of pressure. Above the second threshold of pressure, the area between the piston and the body of the pump may have a positive differential pressure relative to an environment outside of the area, such as the enclosed environment 303 of FIGS. 3A-3D. More specifically, above the second threshold, the area may have a positive differential pressure relative to the inlets and outlets to the pump, such as the inlet and outlet ports 342, 352, and other volumes that may be placed in selective fluid communication with the area via the first check valve and the second check valve. Reaching positive pressure, creates a blowing force between the outlet check valve and pressure chamber. The outlet check valve is configured such that a blowing force greater than the force of gravity may open the outlet check valve. Additionally, the positive pressure creates a blowing force between pressure chamber and inlet check valve. The inlet check valve is configured, such that the blowing force is additive to the force of gravity, further helping to seal and close the inlet check valve during the compression stroke.

At 710, the method 700 increase the pressure of the area between the piston and the body of the pump above a third threshold of pressure. At or above the third threshold of pressure, the blowing force placed on the outlet valve is increased to be greater than the force of gravity on the internal ball of the outlet check valve. The internal ball is raised by the blowing force, opening the outlet valve. Opening of the outlet check valve allows fluid to flow out of the area between the piston and the body and through the outlet check valve. The fluid may comprise both gas and/or liquid, where the gas may be or include air and the liquid may be or include lubricant. Fluid may flow as long as the differential pressure of the chamber is positive, and the differential pressure may remain positive as the volume of the pressure chamber compresses and the piston translates toward the BDC.

At 712, the method 700 rotates the lobe to the BDC position, translating the piston to the BDC. At the BDC the piston stops downward movement and translation toward the body. Upon stopping translation, the differential pressure of the area between the piston and the body may equalize, such that the pressure of the area between the piston and the body and the pressure outside the area are equal. More specifically, when the pressure equalizes, the pressure of the area between the piston and the body and the pressures of the inlet and outlet ports become approximately equal. For an example configuration of the pump, as pressure equalizes, the fluid stops moving out of the area and through the outlet check valve. Likewise, the pressure of the area between the piston and the body of the pump stops increasing. It is to be appreciated that as pressure equalizes the blowing force to the outlet check valve may cease, and the outlet check valve may therein close via the force of gravity at 612. Fluid continues to be expelled from the outlet port if the outlet check valve is closed, from volumes fluidly coupled to and between outlet check valve and the outlet port. For another example of a configuration of the pump, the outlet check valve may remain open at the BDC, as the pressure of the area between the piston and the body remains above the third threshold allowing liquid and gaseous fluid to continue to flow through the outlet check valve. Additionally, for this or another example configuration of the pump the inlet check valve may be opened before the outlet check valve closes. The movement of liquid and gaseous fluid from the area between the piston and the body, may create a suction force greater than the force of gravity and therein great enough to open the inlet check valve. For such a configuration, the inlet check valve and the outlet are opened for a period of time, where fluid flows into the pressure chamber via the inlet check valve and flows out of the pressure chamber via the outlet check valve.

After 712, method 700 ends.

Thus, method 500, method 600, and method 700 provides for a method for a pump, comprising: rotating a cam lobe to move a piston and selectively extend and compress a spring according to a position of the cam lobe relative to the piston; and pumping a one or more fluids while blocking a flow of the liquid via opening a first check valve or a second check valve and closing the other check valve. The first check valve may fluidly couple to an inlet, and the second check valve may fluidly couple to an outlet. The first check valve may be referred to alternatively as an inlet check valve. Likewise, the second check valve may be referred to alternatively as an outlet check valve. Fluid may be pumped into the pump via decreasing pressure to a pressure chamber between the piston and the body, therein opening the first valve via suction. The second valve is configured to be closed due to the force gravity and/or the suction. Likewise, fluid may be pumped out of the pump by increasing pressure to the pressure chamber therein opening the second valve via a blowing force. The second valve is configured to be closed due to the gravity and/or the blowing force.

The disclosure also provides support for a method for reciprocating a pump of a transmission, the pump positioned within the transmission, comprising: rotating a lobe to move a piston, selectively compressing a spring for an expansion stroke according to a position of the lobe relative to the piston, translating the piston from a top dead center toward a bottom dead center, increasing pressure between an inlet check valve and a pressure chamber causing the inlet check valve to close, increasing pressure between an outlet check valve and the pressure chamber causing a blowing force to and opening of the outlet check valve, forcing fluid out from the pressure chamber through the outlet check valve. In a first example of the method further comprising, after a threshold of rotating the lobe to move the piston, selectively extending the spring for an compression stroke according another position of the lobe relative to the piston, translating the piston from the bottom dead center toward the top dead center, decreasing pressure between the outlet check valve and the pressure chamber causing suction and the outlet check valve to close, decreasing pressure between the inlet check valve and the pressure chamber causing suction to and opening of the inlet check valve; and sucking fluid into the pressure chamber through the inlet check valve. In a second example of the method, optionally including the first example, the inlet check valve and the outlet check valve do not comprise preload springs and are closed via a force of gravity. In a third example of the method, optionally including one or both of the first and second examples, the lobe is driven to rotate via a mechanical system, and while reciprocating, a lubrication system including the pump provides targeted lubrication to a component of the mechanical system. In a fourth example of the method, optionally including one or more or each of the first through third examples, pumping fluid includes pumping fluid through an inlet port in fluid communication with the inlet check valve and an outlet port in fluid communication with the outlet check valve, each of the inlet port and the outlet port extending through a side wall of a pump body.

FIG. 4 and FIG. 9 show example configurations with approximate position. FIG. 4 and FIG. 9 are shown approximately to scale; though other relative dimensions may be used. As used herein, the terms "approximately" is construed to mean plus or minus five percent of the range unless otherwise specified.

FIGS. 1-4 and FIGS. 8-10C show example configurations with relative positioning of the various components. If shown directly contacting each other, or directly coupled, then such elements may be referred to as directly contacting or directly coupled, respectively, at least in one example.

Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example While various embodiments have been described above, it may be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for tandem axles, electric tag axles, P4 axles, HEVs, BEVs, agriculture, marine, motorcycle, recreational vehicles and on and off highway vehicles, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus five percent of the range, unless otherwise specified.

The invention claimed is:

1. A pump for lubrication, comprising:
a lobe mounted on and driven by a shaft;
a piston in contact with the lobe;
a pressure hole housing the piston;
a spring acting on the piston;
an inlet check valve positioned in an inlet port; and
an outlet check valve positioned in an outlet port, where
    the inlet check valve and the outlet check valve do not comprise preload springs and are positioned vertically in a normally closed position due to a force of gravity acting on internal balls of the inlet check valve and outlet check valve;
    where an inlet valve central axis of the inlet check valve is parallel to and offset from an outlet valve central axis of the outlet check valve; and
    where each the inlet check valve and the outlet check valve are in direct fluidic communication with the pressure hole.

2. The pump of claim 1 further comprising a pump body of the pump, wherein a cylindrical hole of the pump body of the pump is configured to receive the piston.

3. The pump of claim 1 further comprising a pump body of the pump, wherein the inlet check valve is positioned in and fluidly seals a first hole of the pump body, the outlet check valve is positioned in and fluidly seals a second hole of the pump body, and the first hole and the second hole are arranged vertically with openings open to a surface normal to a vertical axis of the pump.

4. The pump of claim 1, wherein the inlet port fluidly couples a first opening and the outlet port fluidly couples a second opening in fluid communication with a pressure chamber housing the spring and acted on by the piston, and the first opening and the second opening are outside of a piston stroke of the piston, such that the piston is prevented from blocking the first opening or the second opening.

5. The pump of claim 4, wherein the inlet port comprises the first opening and the outlet port comprises the second opening.

6. The pump of claim 4, wherein the inlet port is located in a side wall of a pump body, and the first opening extends through the side wall of the pump body.

7. The pump of claim 4, wherein the outlet port is located in a side wall of a pump body, and the second opening extends through the side wall of the pump body.

8. The pump of claim 1, where the pump is a scavenger pump with a suction side fluidly coupled to a dry sump.

9. The pump of claim 1, wherein the piston includes a skirt.

10. The pump of claim 9, wherein the skirt has a length that is less than a diameter of the piston, where the length is at least than 81% the diameter and no more than 84% the diameter.

11. The pump of claim 1, wherein the lobe is a cam lobe.

12. The pump of claim 1, wherein the lobe is an eccentric lobe.

13. The pump of claim 1, where the shaft is driven by a mechanical system lubricated via the pump.

14. A method for reciprocating a pump of a transmission, the pump positioned within the transmission, comprising:
    rotating a lobe to move a piston that is arranged in a pressure hole, selectively compressing a spring for a compression stroke according to a position of the lobe relative to the piston;

translating the piston from a top dead center toward a bottom dead center;
    increasing pressure between an inlet check valve and a pressure chamber causing the inlet check valve to close;
    increasing pressure between an outlet check valve and the pressure chamber causing a blowing force to and opening of the outlet check valve;
    forcing fluid out from the pressure chamber through the outlet check valve;
    where an inlet valve central axis of the inlet check valve is parallel to and offset from an outlet valve central axis of the outlet check valve; and
    where each the inlet check valve and the outlet check valve are in direct fluidic communication with the pressure hole.

15. The method of claim 14 further comprising, after a threshold of rotating the lobe to move the piston, selectively extending the spring for an expansion stroke according another position of the lobe relative to the piston; translating the piston from the bottom dead center toward the top dead center; decreasing pressure between the outlet check valve and the pressure chamber causing suction and the outlet check valve to close; decreasing pressure between the inlet check valve and the pressure chamber causing suction to and opening of the inlet check valve; and sucking fluid into the pressure chamber through the inlet check valve.

16. The method of claim 15, wherein the inlet check valve and the outlet check valve do not comprise preload springs and are closed via a force of gravity.

17. The method of claim 15, wherein the lobe is driven to rotate via a mechanical system, and while reciprocating, a lubrication system including the pump provides targeted lubrication to a component of the mechanical system.

18. The method of claim 14, wherein pumping fluid includes pumping fluid through an inlet port in fluid communication with the inlet check valve and an outlet port in fluid communication with the outlet check valve, each of the inlet port and the outlet port extending through a side wall of a pump body.

19. A transmission of a vehicle, comprising:
a self-priming pump, including:
    an eccentric lobe;
    a spring;
    a piston configured to receive the spring and interact with the eccentric lobe;
    a pump body including a cylindrical pressure hole that houses the piston and the spring;
    an inlet check valve positioned in an inlet port; and
    an outlet check valve positioned in an outlet port, where
        the inlet check valve and the outlet check valve do not comprise preload springs and are installed vertically in a normally closed position due to a force of gravity acting on internal balls of the inlet check valve and the outlet check valve;
    where an inlet valve central axis of the inlet check valve is parallel to and offset from an outlet valve central axis of the outlet check valve; and
    where each the inlet check valve and the outlet check valve are in direct fluidic communication with the pressure hole.

20. The self-priming pump of claim 19, where the eccentric lobe is rigidly coupled to a rotational element of a mechanical system, the mechanical system drives the eccentric lobe via the rotational element, and the mechanical system receives targeted lubrication by a lubrication system including the self-priming pump.

* * * * *